(12) United States Patent
Ishihara et al.

(10) Patent No.: US 6,718,091 B2
(45) Date of Patent: Apr. 6, 2004

(54) OPTICAL CABLE FOR AN OPTICAL TRANSMISSION AND RECEPTION SYSTEM

(75) Inventors: Takehisa Ishihara, Kashihara (JP); Hajime Kashida, Nara (JP); Kentaro Terashima, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/211,610

(22) Filed: Aug. 2, 2002

(65) Prior Publication Data

US 2003/0002822 A1 Jan. 2, 2003

Related U.S. Application Data

(62) Division of application No. 09/692,264, filed on Oct. 19, 2000, now Pat. No. 6,454,467.

(30) Foreign Application Priority Data

Oct. 19, 1999 (JP) .......... 11-296273
Nov. 18, 1999 (JP) .......... 11-327810
Sep. 1, 2000 (JP) .......... 2000-265319

(51) Int. Cl.$^7$ .......... G02B 6/34
(52) U.S. Cl. .......... 385/36; 385/60; 385/88; 385/93
(58) Field of Search .......... 385/36, 31, 14, 385/60, 24, 33, 49, 88, 89, 93

(56) References Cited

U.S. PATENT DOCUMENTS

| | | | | |
|---|---|---|---|---|
| 4,549,314 A | | 10/1985 | Masuda et al. .......... 385/88 |
| 5,384,885 A | * | 1/1995 | Diner .......... 385/140 |
| 5,594,825 A | * | 1/1997 | Kawasaki et al. .......... 385/60 |
| 6,142,680 A | | 11/2000 | Kikuchi et al. .......... 385/93 |
| 6,188,495 B1 | | 2/2001 | Inoue et al. .......... 359/152 |

FOREIGN PATENT DOCUMENTS

| | | |
|---|---|---|
| JP | 7-248429 | 9/1965 |
| JP | 64-45805 | 3/1989 |
| JP | 10-39181 | 2/1998 |

OTHER PUBLICATIONS

"A Miniaturized Transceiver Using Simplex POF for IEEE1394", by Yoichi Toriumi, et al. International POF Conference '99, pp. 205–208.

* cited by examiner

Primary Examiner—Phan T. H. Palmer
(74) Attorney, Agent, or Firm—Edwards & Angell, LLP; David G. Conlin; George W. Hartnell, III

(57) ABSTRACT

In an optical transmission and reception module, a partitioning member separating a light emitting device and a light receiving device from each other includes a partitioning plate having a concave surface, an engaging portion to which the partitioning plate is fixed, a holding portion holding the engaging portion movably, and a leaf spring for pressing the engaging portion against an optical plug. An end surface of an optical fiber is convex and projects from a front end of the optical plug. When the end surface of the optical plug is in contact with an engaging surface of the engaging portion, a gap is generated between the end surface of the optical fiber and a surface opposed thereto.

3 Claims, 24 Drawing Sheets

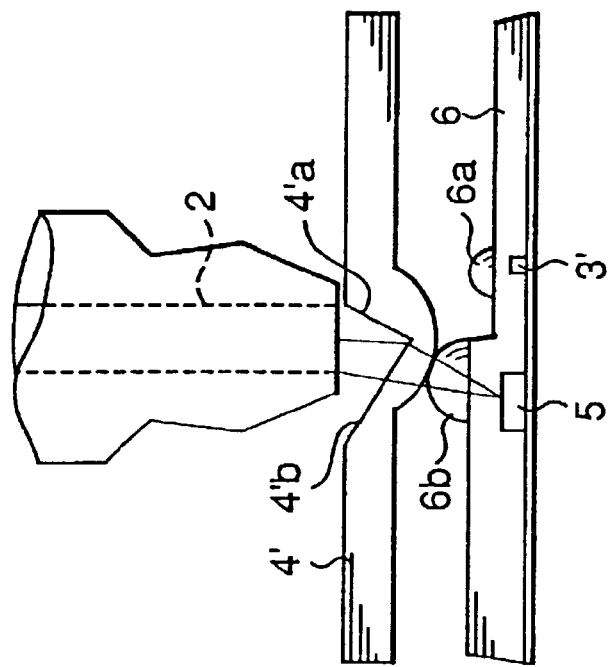
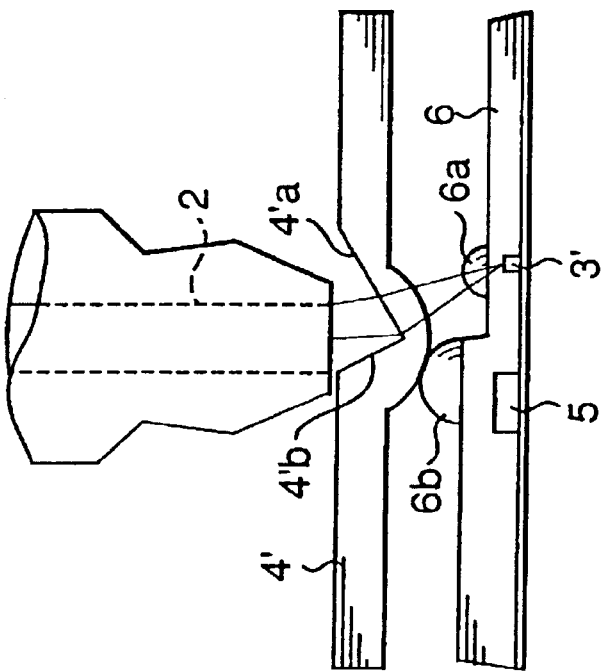

OPTICAL CABLE FOR AN OPTICAL TRANSMISSION AND RECEPTION SYSTEM

CROSS REFERENCE TO RELATED APPLICATIONS

This application is a divisional application of U.S. patent application Ser. No. 09/692,264, filed Oct. 19, 2000 is now U.S. Pat. No. 6,454,467.

BACKGROUND OF THE INVENTION

The present invention relates to a bi-directional optical transmission and reception system for executing transmission and reception by using one-core optical fiber. The present invention also relates to an optical transmission and reception module and an optical cable for use in the optical transmission and reception system. In particular, the present invention relates a digital communication system such as IEEE 1394 and USB2 capable of making high-speed transmission.

A plastic optical fiber cable has been hitherto used in optical communication at home. The plastic optical fiber cable is flexible, can be wired easily, and costs low. Therefore, audio digital signals are actually transmitted in domestic networks, such as audiovisual devices and personal computers, through the plastic optical fiber cable.

At home, it is expected that various factors such as rearrangement of furniture in a room cause frequent alteration of wiring of the optical fiber cable, accompanied with the removal and installation of an optical plug and/or elongation of the optical fiber cable. It is also expected that a user switches a communication medium, depending on use conditions. That is, in a short-distance low-speed communication, optical spatial transmission will be used, whereas in long-distance high-speed communication, the optical fiber cable will be used. To meet the need, development of optical transmission and reception systems are being made.

The protocols (communication methods) in the optical transmission and reception system are classified into a full duplex communication method and a half duplex communication method. The former is capable of accomplishing transmission and reception simultaneously, whereas the latter is incapable of accomplishing reception unless transmission has terminated. It is conceivable that real time transmission of information will be mainly made even at home in the near future. Thus, the construction of the optical transmission and reception system adopting the full duplex communication method is desired.

As an example of a conventional optical transmission and reception module for realizing such an optical transmission and reception system, an optical transmission and reception module proposed in the Japanese Patent Application Laid-Open No. 7-248429 is described below with reference to FIG. 1. The optical transmission and reception module is intended to be compact and inexpensive by adopting the Foucault prism as an optical branching element.

According to the proposed optical transmission and reception module, transmission light T emitted by a light emitting element 101 transmits through a cover glass 102 installed on a package and is divided into halves by a Foucault prism 103. After condensed by a condenser lens 104, a half is coupled to, or incident on, an optical fiber 107 through a rod lens 105. On the other hand, reception light rays R discharged from an optical fiber 107 having the rod lens 105 disposed at its front end are condensed by the condenser lens 104, incident on the Foucault prism 103, and then divided into halves. After they pass through the cover glass 102, only a half is coupled to a light receiving element 106.

However, the disposition relationship between the light emitting element 101 and the light receiving element 106 shown in FIG. 1 forces the light receiving element 106 to be located at a position apart from the condensed point of the reception light R. Accordingly, to detect the diverged reception light R, it is necessary to prepare a large light receiving element 106. Consequently, the electrostatic capacity of the light receiving element 106 is large. Thus it is difficult to realize a high-speed communication.

The limitative position of the light receiving element 106 may be caused by that the light-condensing system consists of the single condenser lens 104 interposed between the optical fiber 107 and the Foucault prism 103 and that the vertical angle of the Foucault prism is as small as 2–3 degrees, as described in a paragraph denoted by [0018] of the Japanese Patent Application Laid-Open No. 7-248429.

As another prior art example, there is an optical transmission and reception module proposed in the Japanese Patent Application Laid-Open No. 10-39181, which module carries out optical transmission and reception through one optical fiber by the half duplex communication method, as shown in FIG. 2.

According to the optical transmission and reception module, half of transmission light rays T emitted by a laser diode LD serving as a light emitting element are reflected from a 50%-beam splitter film BS formed on a prism 121 provided on a light receiving element PD, condensed by a lens 122, and connected to an optical fiber 123. On the other hand, half of reception light rays R discharged from the optical fiber 123 pass through the beam splitter film BS and are connected to the light receiving element PD.

This prior art is advantageous in that one optical fiber is used to carry out the optical transmission and reception by the half duplex communication method. However, because light is branched by means of the beam splitter film BS formed on the prism 121, the optical amount is reduced to half in each of the transmission and the reception. Thus, the optical transmission and reception module is not suitable for a long-distance transmission and reception of an optical signal.

As still another prior art example, there is an optical transmission and reception module proposed in the literature "Miniaturized Transceiver using Simplex POF for IEEE 1394 (International POF Conference '99, pages 205–208)". The optical transmission and reception module carries out optical transmission and reception through one optical fiber by the full duplex communication method, as shown in FIG. 3.

According to the optical transmission and reception module, transmission light rays T are emitted by an LD serving as the light emitting element, condensed by a cylindrical lens 131, reflected from a reflection film 133 (99%) formed on a prism 132, and converged. The converged light is connected to, or incident on, an end surface of the optical fiber. On the other hand, reception light rays R are discharged from the optical fiber and are mostly connected to a photodiode PD, although a part of the light rays R is lost by the reflection film 133. According to the method, because the light rays are connected to the optical fiber, with the light rays converged, in principle, Fresnel light on the end surface of the optical fiber is not connected to the photodiode PD. Thus, the full duplex transmission and reception can be accomplished with one optical fiber.

The prior art shown in FIG. 3 has merits because it can accomplish transmission and reception by using one optical fiber, has only a small light loss in a transmission time, and the transmission light T and the reception light R can be almost completely separated from each other, i.e., the full duplex optical system can be realized. However, in the prior art, the reflection film 133 is formed on the prism, and the cylindrical lens 131 is formed on the reflection film 133. That is, a large number of processes are required in the stage of preparing the optical branching elements. Consequently, the manufacturing cost is high. Further, because the reception light rays R do not pass through a lens, the light receiving element PD is required to be large. Consequently, the electrostatic capacity of the light receiving element PD is large. That is, the conventional art is unsuitable for high-speed communication.

Sharp Kabushiki Kaisha has proposed an optical transmission and reception system as shown in FIGS. 4A and 4B in the Japanese Patent Application No. 11-5872 (filed on Jan. 12, 1999).

In the optical transmission and reception system, it is possible to use a digital audio optical fiber cable which has already spread, and execute two-way communication through one optical cable having one-core optical fiber.

The optical transmission and reception system has an optical cable 41 and an optical transmission and reception module 51.

The optical cable 41 has in its inside a one-core optical fiber 42 serving as the optical path, and has a plug 43 at both ends thereof. The plug 43 is connected to the optical transmission and reception module 51.

The holding member 52, of the optical transmission and reception module 51, having an insertion hole 52a houses a light emitting element 53 converting an electrical signal into an optical signal, a light receiving element 54 converting an optical signal into an electrical signal, a mold package 55 sealing the light emitting element 53 and the light receiving element 54, lenses 55a, 55b formed integrally with the mold package 55, and an optical branching element 56.

The optical cable 41 and the optical transmission and reception module 51 are optically connected to each other by inserting the plug 43 of the optical cable 41 into the insertion hole 52a of the optical transmission and reception module 51.

More specifically, transmission light rays emitted by the light emitting element 53 transmit through the lens 55a formed integrally with the mold package 55, so as to be collimated with one another. Then, the collimated light rays are deflected to the optical-axis direction of the optical fiber 42 by a microprism formed on the surface of the optical branching element 56, and are incident on the optical fiber 42.

On the other hand, light rays discharged from the optical fiber 42 are deflected by the microprism formed on the surface of the optical branching element 56, transmit through the lens 55b formed integrally with the mold package 55, and incident on the light receiving element 54 as condensed light rays.

However, the optical transmission and reception module and the light transmission and reception system using it have the following problems, which will be described below with reference to FIG. 5.

1) Because the light emitting element 53 and the light receiving element 54 are sealed in the single mold package 55, the light rays emitted by the light emitting element 53 travels along a path L1 in the mold package 55 to be incident on the light receiving element 54. As a result, high crosstalk is generated, and this makes impossible to carry out the full duplex communication method.

2) Because the light rays emitted by the light emitting element 53 and the light rays to be received by the light receiving element 54 are deflected by the same optical branching element 56 within the module, the light rays emitted by the light emitting element 53 are reflected from the optical branching element 56 and are incident on the light receiving element 54 along a path L2. As a result, high crosstalk is generated and thus it becomes impossible to carry out the full duplex communication method.

3) Because the same optical fiber 42 is used as both the transmission line for the optical signal from the light emitting element 53 and the transmission line for the optical signal to the light receiving element 54, the signal light rays emitted by the light emitting element 53 are reflected from both end surfaces of the optical fiber 42 and are incident on the light receiving element 54 along a path L3. Thus, high crosstalk is generated, which makes impossible to carry out the full duplex communication method.

4) The optical transmission and reception module is optically connected to its counterpart via the optical fiber 42. Thus, supposing that the optical transmission and reception module and its counterpart (on the left-hand side of the figure) have the same construction, the light rays emitted by the light emitting element 53 will be reflected by an optical branching element 56 of the counterpart and then incident on the light receiving element along a path L4. As a result, high crosstalk will be generated and thus it will be impossible to carry out the full duplex communication method.

As a prior art light-branching device, there is one disclosed in Japanese Utility Model Application Laid-Open No. 64-45805.

FIG. 6 is a schematic partial sectional view of the light-branching device. FIG. 7 shows an end face on the side of a transmission-line optical fiber of a central portion of the light-branching device of FIG. 6.

As shown in FIGS. 6 and 7, in the light-branching device, a pair of bare optical fibers 161, 161 are combined with each other with a reflection film 162 of a predetermined length disposed therebetween. The end surfaces of the bare optical fibers 161, 161 combined with each other are coaxially disposed in opposition to the end surface of a transmission-line optical fiber 163.

In the case where the light-branching device is used as the light-branching element for an optical transmission and reception module, a problem occurs. The problem is described below with reference to FIGS. 6 and 7.

1) Each time the optical fiber 163 is connected to the light-branching device and disconnected therefrom, the transmission-line optical fiber 163 contacts the bare optical fibers 161, 161 of the light-branching device at their end surfaces confronting the optical fiber 163. Consequently, the mutually confronting end surfaces of the bare optical fibers 161, 161 and transmission-line optical fiber 163 will be damaged. Thus, the transmittances thereof deteriorate.

2) Reflected light is generated on the end surface of the reflection film 162 which contacts the end surface of the optical fiber 163. The reflected light, which is an optical transmission signal emitted by a light emitting element of a counterpart of the pertinent module, will be incident on a light receiving element of the counterpart. In the case where the counterpart has the same construction as that of the pertinent optical transmission and reception module, reflected light is generated also on the end surface of a reflection film of the counterpart, and the reflected light of transmission light emitted by the light emitting element of the pertinent optical transmission and reception module will be incident on the light receiving element of the same. Consequently, crosstalk will be high and it will be impossible to carry out the full duplex communication method.

SUMMARY OF THE INVENTION

In view of the problems, it is an object of the present invention to provide an optical transmission and reception system suppressing crosstalk and allowing optical transmission and reception to be accomplished by a full duplex communication method, as well as providing an optical transmission and reception module and an optical plug for the optical transmission and reception system.

There is provided, according to an aspect of the invention, an optical transmission and reception module for duplex-communication performing optical transmission and reception through an identical optical fiber, comprising:

a light emitting element for emitting transmission light;

a light receiving element for receiving reception light;

a transmission optical system disposed in a position that falls between the light emitting element and an end surface of the optical fiber when the optical fiber is in place in the module;

a reception optical system disposed in a position that falls between the light receiving element and the end surface of the optical fiber when the optical fiber is in place in the module; and a Foucault prism having:
  a first inclined surface for refracting the transmission light coming from the light emitting element and taken out by the transmission optical system, and coupling the refracted transmission light to the end surface of the optical fiber; and
  a second inclined surface for refracting at least part of the reception light discharged from the optical fiber, and coupling the refracted reception light to the light receiving element through the reception optical system.

With the above arrangement, the transmission light taken out from the light emitting element through the optical system is refracted only by the first inclined surface of the Foucault prism. Thus, in principle, loss of light does not occur on the Foucault prism and thus the transmission light can be efficiently connected or coupled to the optical fiber. Further, most of return light rays including principle light rays generated by Fresnel reflection in connecting the transmission light to the optical fiber return to the first inclined surface of the Foucault prism. Therefore, it is possible to reduce the amount of the transmission light that enters the light receiving element of the module at the transmission end. Accordingly, a highly efficient optical communication can be realized in the optical transmission and reception module to be used for the full duplex communication schemes that carry out optical transmission and reception simultaneously. Further, using the Foucault prism having the above configuration as a branching element can reduce the size of the optical transmission and reception module in the longitudinal direction.

At least one of the light emitting element and the light receiving element may be sealed with a resin, and the resin may form a lens of the transmission optical system or the reception optical system on a straight line connecting a light emitting surface or a light receiving surface to the corresponding inclined surface of the Foucault prism.

For example, the light emitting element and/or the light receiving element can be resin-molded, and in the resin-molding process a lens can be integrally formed so as to be directed toward the corresponding inclined surface (first and/or second inclined surface) of the Foucault prism. By thus doing, transmission efficiency and/or reception efficiency can be improved. Further, if the periphery of the light emitting element is sealed with the resin, the critical angle at a resin-air interface is increased. Thus, the light take-out efficiency can also be improved.

The light emitting element and the light receiving element may be mounted on an identical substrate which is disposed, for example, on a plane almost parallel to the Foucault prism. By thus doing, the mounting process steps for the individual elements can be facilitated. Therefore, it is possible to reduce the number of manufacturing process steps and shorten working period of time, and further facilitate the positioning of the substrate relative to the optical transmission and reception module. Eventually, the mass-production price can be reduced.

Both the light emitting element and the light receiving element may be sealed with a resin, and the resin may form lenses of each of the transmission optical system and the reception optical system on straight lines connecting each of a light emitting surface and a light receiving surface to the first and second inclined surfaces of the Foucault prism, respectively.

For example, the light emitting element and the light receiving element can be resin-molded, and in the resin-molding process lenses can be integrally formed so as to be directed toward their respective associated inclined surfaces of the Foucault prism. By thus doing, both the transmission efficiency and the reception efficiency can be improved. Further, because the periphery of the light emitting element is sealed with the resin, the critical angle at a resin-air interface is increased. Thus, light take-out efficiency is also improved.

A condenser lens for use in both transmission and reception operations is provided between the Foucault prism and the light emitting and receiving elements. In this case, in a transmission time, the transmission optical system such as a lens is not required to converge light rays coming from the light emitting element. That is, the condenser lens converts light rays, even diffused light rays, coming from the transmission optical system into converged light rays. This arrangement provides against the dislocation of the optical fiber relative to a transmission part of the module. On the other hand, in a reception time, light rays discharged from an end of the optical fiber diffuse or spread at an angle determined by the NA value (numerical aperture) of the optical fiber. Thus, the light rays refracted by the Foucault prism will also diffuse. However, before they diffuse, they are collimated with one another by the condenser lens. Then, they are coupled to the light receiving element with the aide of the reception optical system such as a lens. Accordingly, it is possible to greatly improve efficiency in the reception time.

The Foucault prism and the condenser lens may be formed integrally by, for example, injection molding. By thus doing, it is possible to reduce the number of component parts and thus reduce the number of manufacturing process steps and shorten a working time period, which makes it possible to reduce the cost for manufacturing the optical transmission and reception module. It is also possible to suppress Fresnel reflected light which would be generated in the interface between the condenser lens and the Foucault prism if they are provided separately.

If a partitioning member is interposed between a transmission part and a reception part of the module, it is possible to prevent the transmission light from being directly connected as turbulent light to the light receiving element. Thereby, the S/N ratio at the light receiving element can be improved. Accordingly, a high-quality full duplex communication system can be realized.

The partitioning member may, preferably, be movable in a principal axis direction of the optical fiber when the partitioning member comes into contact with or strikes against an end surface of the optical fiber. This arrangement can be achieved by, for example, by providing the partitioning member, such as a partitioning plate, with a jig such as a spring that allows the partitioning plate to move to the depth of the module when the end surface of the optical fiber comes into contact with the partitioning plate. The movable partitioning plate enables to prevent the end surface of the optical fiber from being damaged by the contact with the partitioning plate. Thus, efficiency in optical transmission and reception is prevented from deteriorating due to the damage of the optical fiber end surface.

The partitioning member may, preferably, have an optical reflecting property. For example, by using a light-tight plate, or light-screening plate, as the partitioning member, having a sufficiently high reflectance or reflectivity of 80% or higher for the transmission light and the reception light, it is possible to effectively utilize as the reception light even such light as would be absorbed in a light reception time if the partitioning member has a surface having a high absorptivity.

Preferably, an end surface of the partitioning member confronting the end surface of the optical fiber may have an optical absorbing property. For example, a light-tight plate whose end surface has a sufficiently high absorptivity of 80% or higher for the transmission light and the reception light can be used as the partitioning member. Then, it is possible to reduce a so-called a "far-side reflection", namely the reflection of the transmission signal at the side of a counterpart module currently serving as the reception end (in this case the reflection is caused by an end surface of the partitioning member in the counterpart module). Thus, the S/N ratio at the light receiving element can be improved.

A curvature of the lens, formed of the sealing resin, of the transmission optical system may be so set that a bundle of convergent light rays falling within a numerical aperture is incident on the end surface of the optical fiber. Alternatively or additionally, a curvature of the condenser lens may be so set that a bundle of convergent light rays falling within a numerical aperture is incident on the end surface of the optical fiber.

By thus making the transmission light incident on the end surface of the optical fiber at an angle such that the transmission light becomes convergent light of a size corresponding to the NA value of the optical fiber or smaller, it is possible to prevent Fresnel reflected light off the near-side end surface of the optical fiber from disadvantageously entering the light receiving element in the module serving now as the transmission end. Thus, the S/N ratio at the light receiving element can be improved. In other words, the utilization efficiency of the transmission light emitted by the light emitting element can be improved to a higher extent.

There is also provided, according to another aspect of the invention, An optical transmission and reception module, comprising a light emitting element emitting transmission light and a light receiving element receiving reception light, for transmitting and receiving the light by using an identical one-core optical fiber, further comprising:

a light-tight partitioning plate touching an end surface of the optical fiber when the optical fiber is in place in the module, and separating an optical path of the transmission light and that of the reception light from each other.

With this arrangement, it is possible to prevent the transmission light emitted by the light emitting element from being reflected by the near-side end surface of the optical fiber (namely, the end surface near this module of the optical fiber) to eventually enter the light receiving element of the same module. Thus, it is possible to suppress crosstalk caused by the influence of the reflection of the transmission light by the near-side end surface of the optical fiber. As a result, optical transmission can be accomplished by the full duplex communication method.

In one embodiment, the partitioning plate is located at a position where the partitioning plate is pressed by the end surface of the optical fiber when the optical fiber is fitted into the module, and the partitioning plate is elastically deformable when pressed by the end surface of the optical fiber.

With this arrangement, even though there are variations in installed length of optical fibers because of molding variations, it is possible to absorb the variations by the mounted position and the elastic deformation of the partitioning plate. Thus, the partitioning plate does not fail to be in contact with the near-side end surface of the optical fiber. Accordingly, irrespective of the variations in installed length of optical fibers, crosstalk caused by the influence of the reflection of the transmission light by the near-side end surface of the optical fiber can be suppressed, so that optical transmission can be accomplished by the full duplex communication method.

The partitioning plate may have a partitioning portion touching the end surface of the optical fiber and an elastically deformable portion that elastically deforms when the partitioning plate is pressed by the end surface of the optical fiber.

With this arrangement, even though the end surface of the optical fiber presses the partitioning portion, the partitioning portion is prevented from being slid laterally on the optical fiber end surface or deformed into an arcuate shape. Further, it is possible to prevent the partitioning plate from rubbing against the end surface of the optical fiber or striking a corner of the partitioning plate against the end surface of the optical fiber. Thus, the end surface of the optical fiber is prevented from being damaged.

In one embodiment, a light absorbing layer is formed on a contact surface of the partitioning plate that touches the end surface of the optical fiber.

With the construction, it is possible to prevent transmission light coming from an associated module, which is connected with the pertinent module through the optical fiber, from being reflected by the contact surface of the partitioning plate and entering the light receiving element of the associated module. Consequently, it is possible to suppress crosstalk at the associated module caused by the influence of light reflected from the contact surface of the partitioning plate.

The partitioning plate may be extended toward the light emitting and receiving elements such that the partitioning plate is interposed between optical elements provided between the end surface of the optical fiber and each of the light emitting and receiving elements, and/or interposed between the light receiving element and the light emitting element.

According to the construction, it is possible to prevent the transmission light emitted by the light emitting element and reflected from the rear surfaces of the optical elements in the module from entering the light receiving element of the same module. Alternatively or additionally, it is possible to cut off the transmission light propagating toward the light receiving element in the same module through, for example, a mold package sealing the light emitting and receiving elements. Thus, such transmission light does not enter the receiving element in the same module. That is, it is possible to suppress crosstalk caused by the influence of the light reflected by the rear surfaces of the optical elements or the light propagating in the mold package in the module.

In one embodiment, the partitioning plate may be formed of an electrically conductive material and an electrical potential of the partitioning plate is set to a ground potential.

With the construction, it is possible to prevent an inductive coupling between the light emitting element and the light receiving element in the same module and thus suppress crosstalk caused by the influence of the inductive coupling in this module.

In one embodiment, optical elements are disposed between the end surface of the optical fiber and each of the light emitting and receiving elements, and an anti-reflection film is formed on an optical-fiber-side surface of each optical element With the construction, it is possible to prevent the transmission light emitted by a light emitting element in an associated module from being reflected by the surfaces of the optical elements to disadvantageously enter a light receiving element of the associated module. That is, it is possible to suppress crosstalk in the associated module caused by the influence of the light reflected by the surfaces of the optical elements.

Each optical element disposed between the light emitting and receiving elements and the near-side end surface of the optical fiber may comprise an optical deflection element, and the light receiving element and the light emitting element may be inclined relative to optical axes of the optical deflection elements.

This arrangement prevents the transmission light emitted by a light emitting element of an associated module, or a counterpart of the present module, from being reflected by the light emitting element and the light receiving element of the present module to enter a light receiving element of the associated module.

According to another aspect of the invention, there is also provide comprising:

The optical transmission and reception module as described above combined with an optical cable having a one-core optical fiber inside constitutes an optical transmission and reception system. In this system, the optical fiber has inclined end surfaces.

In this system, it is possible to prevent the transmission light sent from one end surface of the optical fiber from being reflected from the other end surface thereof to enter a light receiving element of a module in which the other end surface of the optical fiber is received. Consequently, it is possible to suppress crosstalk caused by the influence of light reflected by the far-side end surface of the optical fiber (namely, the end surface at the side far from the relevant module). Thus, optical transmission can be accomplished by the full duplex communication method.

In the aforementioned optical transmission and reception system in which the partitioning plate is in contact the end surface of the optical fiber, when the optical plug is rotated, with the end surface of the optical fiber in contact with the partitioning plate, there is a possibility that the end surface of the optical fiber and/or the partitioning plate is broken. To avoid this, it is necessary to provide the optical plug and the optical transmission and reception module with an anti-rotation mechanism. The anti-rotation mechanism can be realized by, for example, providing the optical plug with a key while providing the optical transmission and reception module with a keyway. However, unless the anti-rotation key is fitted in the keyway of the optical transmission and reception module, the optical plug cannot be inserted into the optical transmission and reception module. This is an inconvenience to the user.

Accordingly, it is another object of the present invention to provide an optical transmission and reception module which uses a light-tight partitioning plate to enable an optical transmission according to the full-duplex communication method, as well as providing an optical cable and an optical transmission and reception system using the module and the optical fiber, in which rotation of an optical plug in the optical transmission and reception module causes damages to neither the end surface of the optical fiber nor the partitioning plate.

To achieve this object, there is provided, according to a further aspect of the invention, an optical transmission and reception module, comprising a light emitting element emitting transmission light and a light receiving element receiving reception light, for transmitting and receiving the light by using an identical one-core optical fiber, further comprising:

a light-tight partitioning member separating an optical path of the transmission light and that of the reception light from each other, wherein the partitioning member has an opposed surface to be opposed to an end surface of the optical fiber, with a gap left between the partitioning member and an end surface of the optical fiber, when the optical fiber is in place in the module.

With the above construction, when the optical plug accommodating the optical fiber is mounted inside the optical transmission and reception module, there is a gap between the end surface of the optical fiber and the opposed surface of the partitioning member confronting the end surface of the optical fiber. Thus, these mutually confronting surfaces do not contact each other even when the optical plug rotates. Thus, it is possible to prevent these members from being damaged. Therefore, it is unnecessary to provide the optical transmission and reception module and the optical plug with any anti-rotation mechanism. Thus, the user can fit the optical plug in the optical transmission and reception module easily.

From the viewpoint of the optical transmission by the full duplex communication method, the gap (G) may be, preferably, in the range of 0 mm<G<0.3 mm, and more preferably about 0.2 mm. When the gap lies in this range, the bit error rate (BER) can be reduced to 1E-12 (i.e., $10^{-12}$), although depending somewhat on the optical system, and hence it is possible to achieve optical transmission by the full duplex communication method.

The partitioning member may have a positioning means for, when the optical fiber is placed in position in the module, positioning the opposed surface relative to the end surface of the optical fiber such that the gap is constant. By providing the partitioning member with the positioning means, the dimension of the gap between the end surface of the optical fiber and the opposed surface of the partitioning member is prevented from changing each time the optical plug is inserted in the optical transmission and reception module. Accordingly, it is possible to carry out full duplex communication stably.

In one embodiment, the positioning means comprises an engaging surface to touch an end surface of an optical plug holding the optical fiber therein, and the engaging surface has a fixed positional relationship with the opposed surface.

In another embodiment, the positioning means comprises an engaging surface to touch a portion of the end surface of the optical fiber through which portion light does not pass, and the engaging surface has a fixed positional relationship with the opposed surface.

It is preferable to use a slippery material, namely, a material having a low coefficient of sliding friction for the engaging surface. Even though the optical plug is rotated a lot of times, the contact portion is hardly broken.

The partitioning member may have a spring means urging the engaging surface toward the optical fiber. In this case, the engaging surface is pressed against the end surface of the optical plug or a portion of the end surface of the optical fiber through which light does not pass. Thus, it is possible to prevent the dimension of the gap from being varied while the optical plug is in the module.

In one embodiment, the partitioning member comprises:

a partitioning plate disposed between the light emitting element and the light receiving element and having the opposed surface;

an engaging portion to which the partitioning plate is fixed and which has the engaging surface; and a holding portion holding the engaging portion such that the engaging portion is movable in a direction of an optical axis of the optical fiber, the holding portion having a spring means for urging the engaging portion to the optical fiber.

With this arrangement, when a comparatively long optical plug is inserted in the module, the engaging portion moves toward the bottom of the module (to the side opposite to a plug insertion hole) from an initial position against the spring force of the spring means, while the engaging portion is being held by the holding portion. As a result, the engaging surface moves toward the bottom of the module from the initial position. Accordingly, by setting a position corresponding to a conceivable shortest length of the optical plug as an initial position of the engaging portion in consideration of variations (tolerance) of the length of optical plugs in a manufacturing stage, the movement of the engaging portion absorbs the variations.

In one embodiment, the engaging portion has a generally truncated-cone-shaped hole and receives a front end of the optical plug having an optical fiber in the hole.

When the opposed surface of the partitioning member is complementary in shape to the end surface of the optical fiber, the dimension of the gap can be reliably allowed to be constant over the entire end surface of the optical fiber.

Furthermore, the present invention provides an optical cable having a one-core optical fiber passed therethrough, wherein each of end surfaces of the optical fiber is a curved surface rotationally symmetrical about an optical axis of the optical fiber. Use of such an optical cable prevents transmission light sent from one end surface of the optical fiber from being reflected by the other end surface thereof to be back to the one end surface and eventually enter the light receiving element.

The rotationally symmetrical curved surface is, for example, a convex surface. Alternatively, it may be a cone-shaped surface.

A combination of any of the optical transmission and reception modules and the optical cable can provide an optical transmission and reception system which are not subject to damages of the optical fiber and the partitioning member due to the rotation of the optical plug in the module, which reliably accomplishes the full duplex optical communication, and which provides a convenience to a user.

Each end surface of the optical fiber may project from a plug provided at opposite ends of the optical fiber, and a radially outward portion of the end surface of the optical fiber may cover a part of an end surface of the plug. The structure of the end surfaces of the optical fiber may be adopted especially in the embodiment in which the engaging surface of the partitioning member touches a portion of the end surface of the optical fiber through which light does not pass.

Other objects, features and advantages of the present invention will be obvious from the following description.

BRIEF DESCRIPTION OF THE DRAWINGS

The present invention will become more fully understood from the detailed description given hereinbelow and the accompanying drawings which are given by way of illustration only, and thus are not limitative of the present invention, and therein:

FIGS. 22A and 22B show an optical system of an optical transmission and reception module according to an 11th embodiment, in which FIG. 22A shows an optical disposition or arrangement which is advantageous and favorable to a transmission or sending side, and FIG. 22B shows an optical disposition which is advantageous to a receiving side;

DETAILED DESCRIPTION OF THE PREFERRED EMBODIMENTS (First Embodiment)

Figure 1:
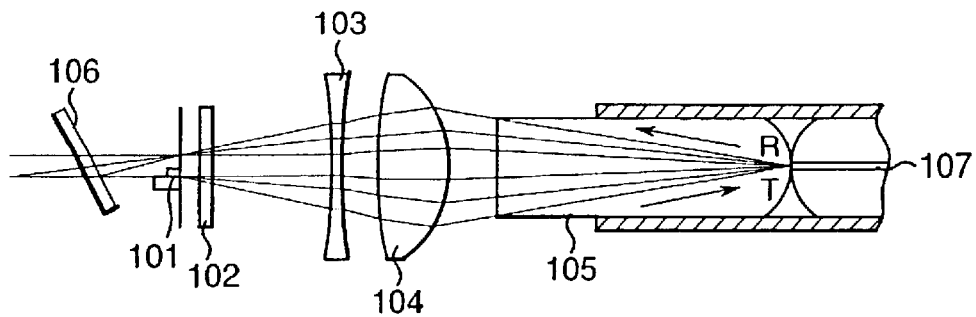
FIG. 1 is a view schematically showing the construction of a conventional optical transmission and reception module.
Figure 2:
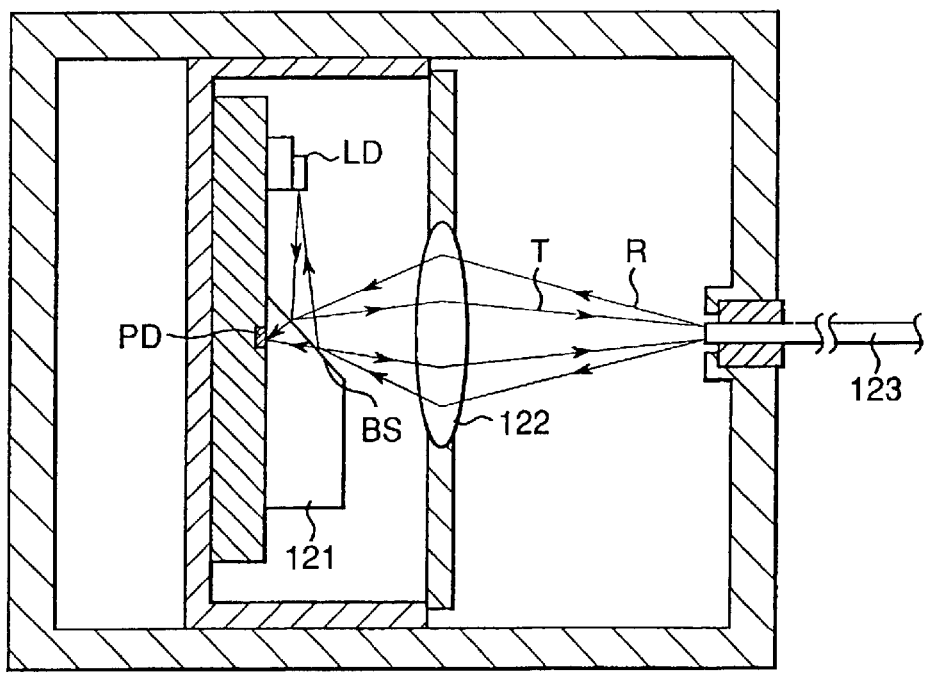
FIG. 2 is a sectional view schematically showing the construction of another conventional optical transmission and reception module.
Figure 3:
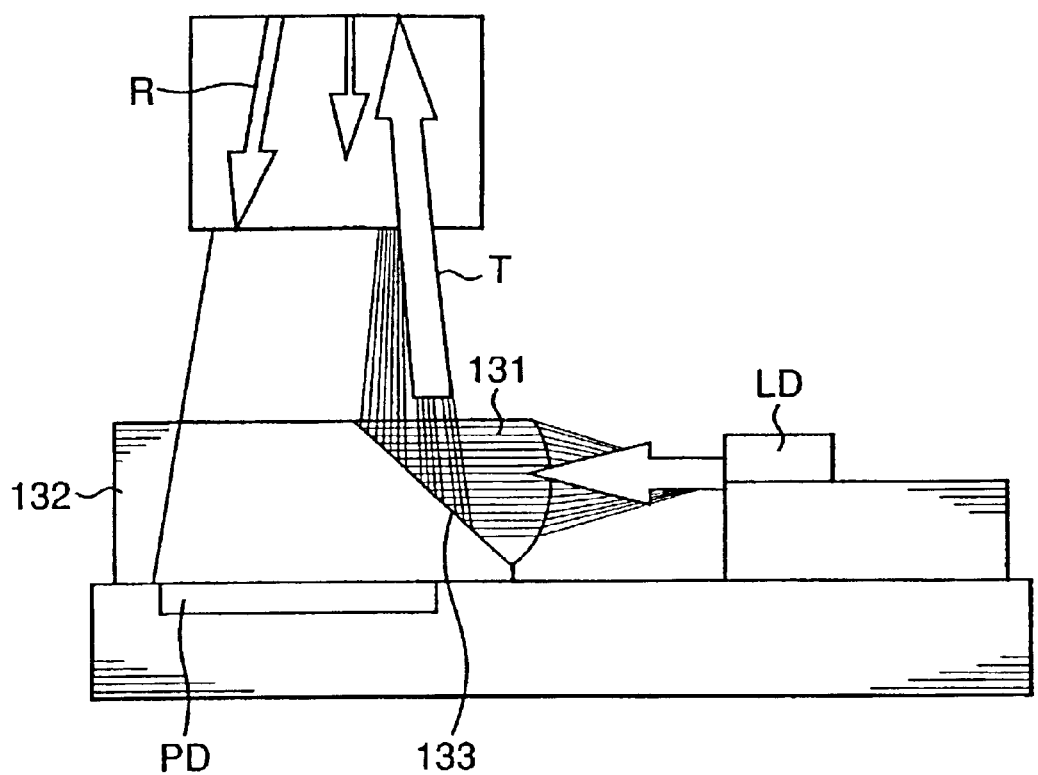
FIG. 3 is a view schematically showing the construction of still another conventional optical transmission and reception module.
Figure 4A:
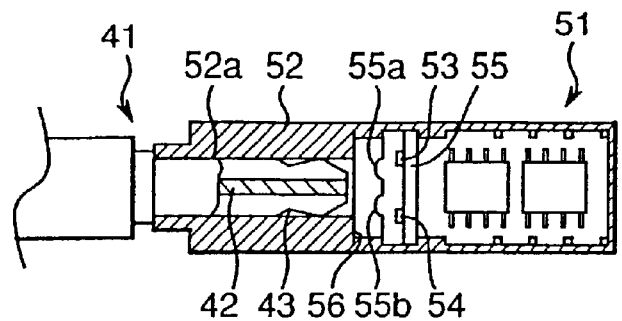
FIGS. 4A and 4B are sectional views of an optical transmission and reception module in an optical transmission and reception system of a related art, which show the interior of the module as viewed from above and sideways.
Figure 4B:
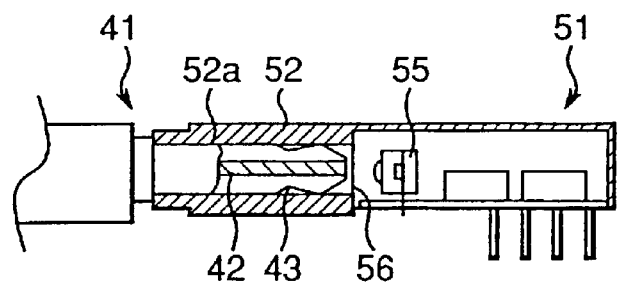
Figure 5:
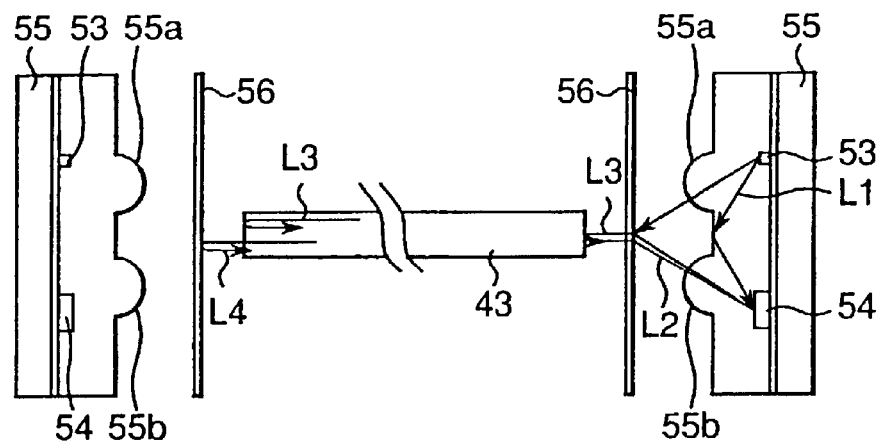
FIG. 5 shows an optical system of the optical transmission and reception system shown in FIGS. 4A–4B.
Figure 6:
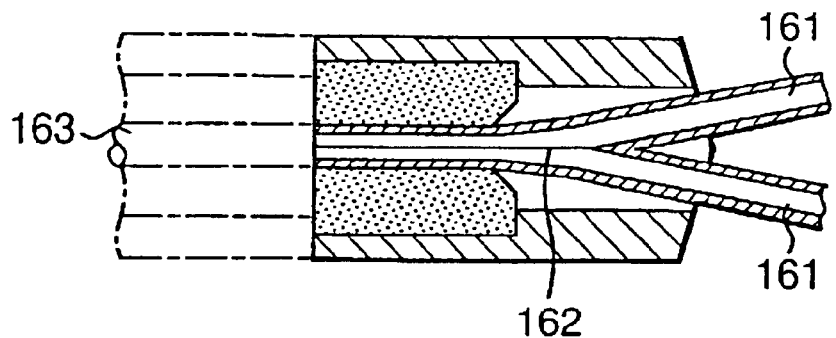
FIG. 6 is a schematic partial sectional view of a conventional light-branching device.
Figure 7:
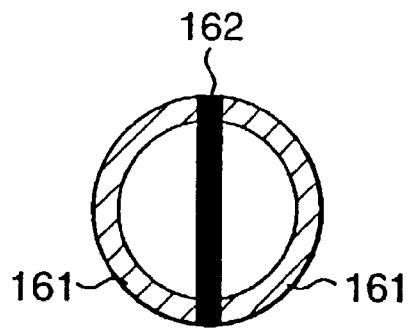
FIG. 7 is a view showing an end face on the side of a transmission-line optical fiber of a central portion of the light-branching device of FIG. 6.
Figure 8:
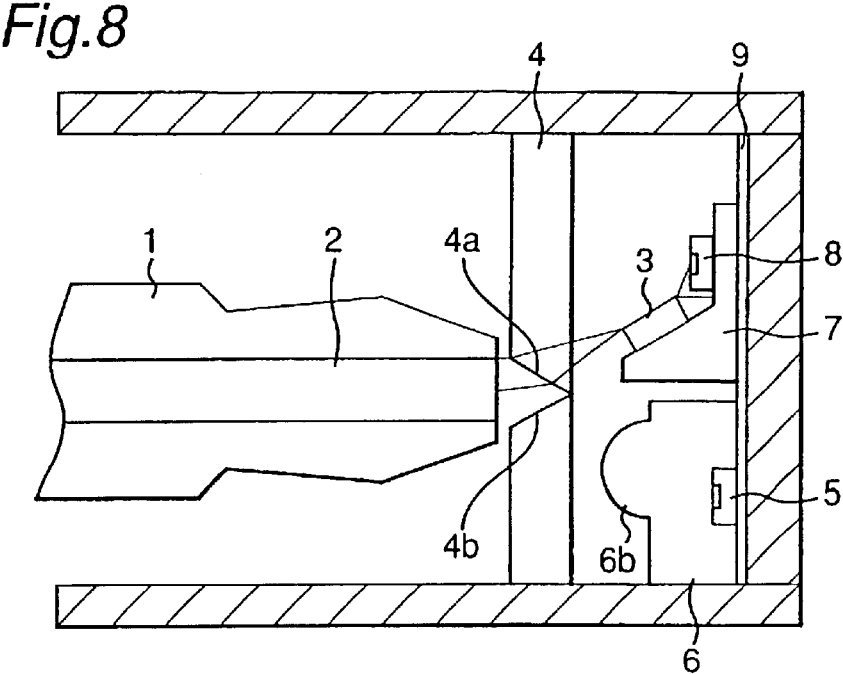
FIG. 8 is a schematic sectional view of main parts of an optical transmission and reception module according to a first embodiment of the present invention.

FIG. 8 schematically shows the construction of main parts of an optical transmission and reception module according to a first embodiment of the present invention.

In the optical transmission and reception module, a full duplex communication method is adopted to perform both an optical transmission and an optical reception by using one optical fiber 2 accommodated in an optical plug 1. The optical transmission and reception module includes a Foucault prism 4 having a first inclined surface 4a for refracting transmission light taken out from a laser diode (hereinafter referred to as "LD") 3 as a light emitting element and making the transmission light incident on an end surface of the optical fiber 2 almost perpendicularly thereto, and a second inclined surface 4b for refracting about a half of reception light discharged from the optical fiber 2 and making the reception light incident on a light receiving photodiode (hereinafter referred to as "receiving PD") 5 serving as a light receiving element.

In the first embodiment, the receiving PD 5 is sealed with a mold resin 6 that forms a lens portion 6b which constitutes a receiving optical system. The LD 3 and a monitoring photodiode (PD) 8 are mounted on a sub-mount 7. The receiving PD 5 and the sub-mount 7 are mounted on a substrate 9 disposed within a plane substantially parallel to the Foucault prism 4.

In the first embodiment, no lens is interposed between the optical fiber 2 and the Foucault prism 4. The reception light reaches the second inclined surface 4b directly from the end surface of the optical fiber 2, whereas the transmission light reaches the end surface of the optical fiber 2 directly from the inclined surface 4a of the Foucault prism 4.

In the first embodiment, the optical transmission and reception module does not have a transmitting optical system. This is because the LD 3 is used as the light emitting element. That is, because light emitted by the LD is not so divergent as light emitted by an LED, it is unnecessary to provide the optical transmission and reception module with the transmitting optical system. In other words, the LD itself has the function of the transmitting optical system.

The Foucault prism 4 can be shaped by injection molding method or the like. It is desirable to select a weather-resistant material for forming the Foucault prism 4. For example, ARTON-FX manufactured by JSR Corporation (Japan Synthetic Rubber Co., Ltd.), ZEONEX manufactured by Nippon Zeon Co., Ltd., and the like can be used as the material of the Foucault prism 4. From the viewpoint of the moldability of the material in a processing time, it is desirable to form a die with an appropriate tapered angle at a portion corresponding to a peripheral portion of the Foucault prism 4.

In the first embodiment, the receiving PD 5 is sealed with the mold resin 6 by a transfer molding method or the like. A weather-resistant material is suitable for forming the mold resin 6, similarly to the Foucault prism 4. A material consisting of epoxy resin, for example, CEL-T-2000 manufactured by Hitachi Chemical Co., Ltd. is preferably used as the material of the mold resin 6. In sealing the receiving PD 5 with the mold resin 6, it is preferable to form the spherical or aspherical lens portion 6b above the receiving PD 5 obliquely relative thereto to greatly improve the coupling efficiency of the reception light discharged from the optical fiber 2 with the receiving PD 5. From the viewpoint of the moldability of the material of the mold resin 6 in a processing time, it is desirable to form a die with an appropriate tapered angle at a portion corresponding to a peripheral portion of the mold resin 6.

According to the first embodiment, after the transmission light emitted by the LD 3 is refracted by the first inclined surface 4a of the Foucault prism 4, the transmission light is connected to the optical fiber 2. On the other hand, about half the reception light discharged from the optical fiber 2 is refracted by the Foucault prism 4, and then connected to the receiving PD 5 through the lens portion 6b of the mold resin 6. As is obvious from the above, it is possible to accomplish an optical transmission and reception using one optical fiber 2, namely, full duplex communication by interposing the Foucault prism 4 having the first and second inclined surfaces 4a and 4b between the optical fiber 2 and the LD 3 serving as the light emitting element as well as the receiving PD 5 serving as the light receiving element.

(Second Embodiment)

Figure 9:
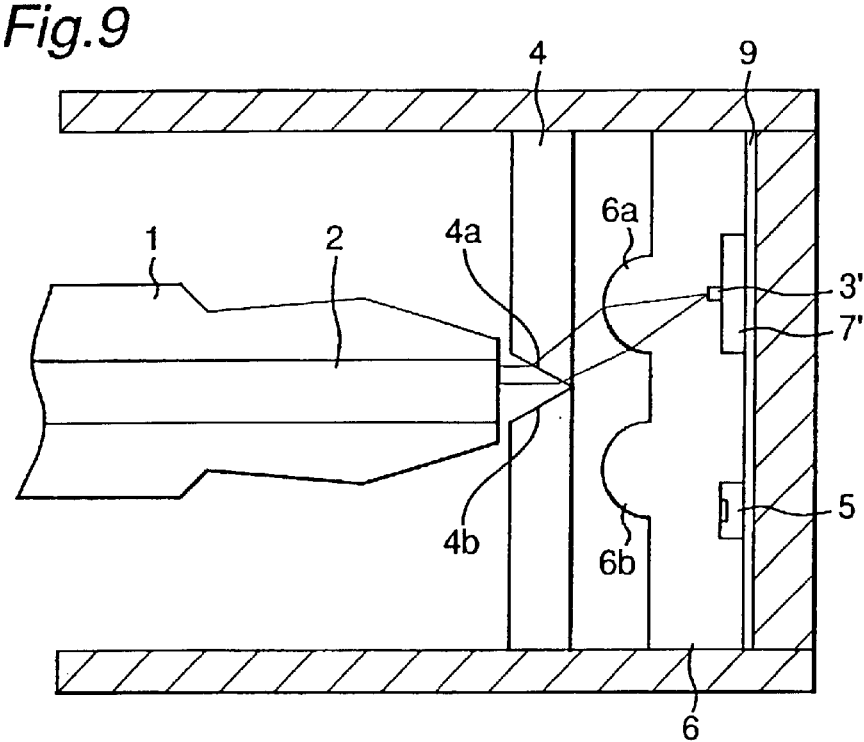
FIG. 9 is a schematic sectional view of main parts of an optical transmission and reception module according to a second embodiment.

FIG. 9 schematically shows the construction of main parts of an optical transmission and reception module according to a second embodiment of the present invention. The parts, shown in FIG. 9, same as or similar to those shown in FIG. 8 are denoted by the same reference numerals as those used in FIG. 8

The optical transmission and reception module of the second embodiment is similar to that of the first embodiment except that a light emitting diode (LED) 3' is used as a light emitting element, that both the LED 3' and the receiving PD 5 are sealed with the mold resin 6, and that the mold resin 6 is formed with a lens portion 6a constituting a transmission optical system.

The LED 3' is mounted on a sub-mount 7'. The receiving PD 5 and the sub-mount 7' are mounted on the substrate 9 disposed in a plane substantially parallel to the Foucault prism 4.

The LED 3' and the receiving PD 5 are sealed with the mold resin 6 by the transfer molding method or the like. A weather-resistant material is suitable for forming the mold resin 6, similarly to the Foucault prism 4. A material consisting of epoxy resin, for example, CEL-T-2000 of Hitachi Chemical Co., Ltd. is preferably used as the material of the mold resin 6. In sealing the LED 3' and the receiving PD 5 with the mold resin 6, preferably, spherical or aspherical lens portions 6a and 6b are formed obliquely relative to the LED 3' and the receiving PD 5 to thereby greatly improve the connection or coupling efficiency of the transmission light to the optical fiber 2 and that of the reception light discharged from the optical fiber 2 to the receiving PD 5. From the viewpoint of the moldability of the material of the mold resin 6 in a processing time, it is desirable to form a die with an appropriate tapered angle in a portion corresponding to a peripheral portion of the mold resin 6.

According to the second embodiment, after the transmission light emitted by the LED 3' is refracted first by the lens portion 6a and then by the first inclined surface 4a of the Foucault prism 4, the transmission light is coupled to the optical fiber 2. On the other hand, about half the reception light discharged from the optical fiber 2 is refracted by the inclined surface 4b of the Foucault prism 4, and is connected to the receiving PD 5 through the lens portion 6b of the mold resin 6. As is obvious from the above, it is possible to accomplish an optical transmission and reception using one optical fiber 2, namely, full duplex communication by interposing the Foucault prism 4 having the first and second inclined surfaces 4a and 4b between the optical fiber 2 and the LED 3' serving as the light emitting element as well as the receiving PD 5 serving as the light receiving element.

In the second embodiment, the LED is used as the light emitting element. The LED has a characteristic that the emission of the LED is lower in directivity and spreads in a spatially wider angle than the LD. Thus, even though the lens portion 6a is provided obliquely relative to the principal light ray of the LED, light emitted by the LED can be efficiently utilized.

That is, according to the second embodiment, the LED 3', which is a light source emitting light spatially spreading relatively widely, is used as the light emitting element. Thus, the optical transmission and reception module of this embodiment costs lower than the one using a laser diode. In addition, light rays other than the principal light ray of the light emitting element can be effectively connected to the first inclined surface 4a of the Foucault prism 4 to thereby improve the transmission efficiency. Further, because it is unnecessary to direct the light emitting element LED 3' toward the first inclined surface 4a of the Foucault prism 4, it is possible to facilitate a chip-mounting operation to thereby reduce a mass-production price. Optical transmission and reception modules using an LED of other embodiments, which will be described later, have also the advantages of the second embodiment.

(Third Embodiment)

Figure 10:
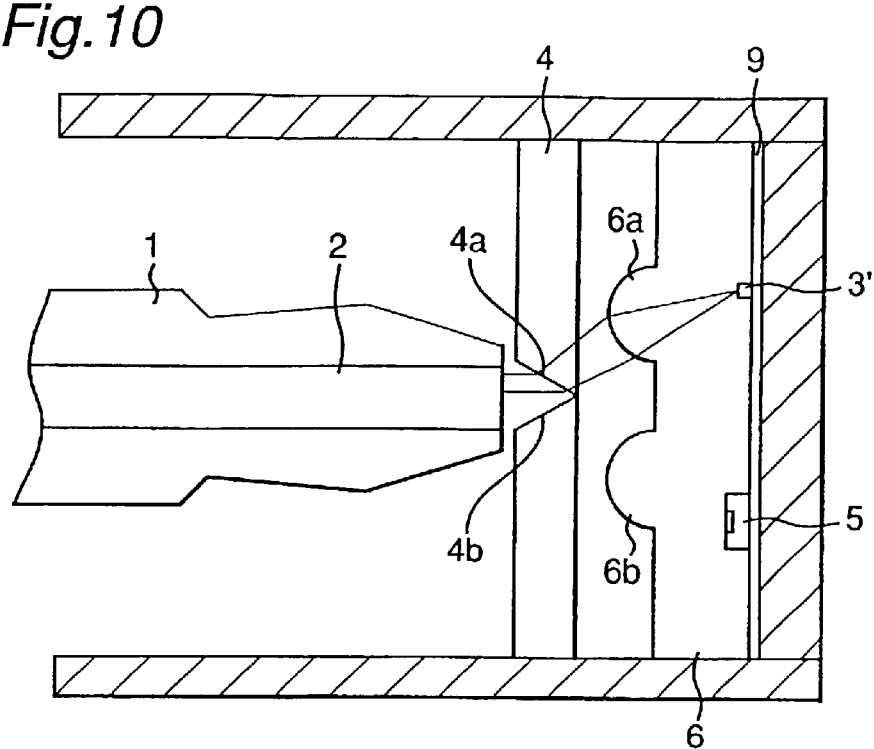
FIG. 10 is a schematic sectional view of main parts of an optical transmission and reception module according to a third embodiment.

FIG. 10 schematically shows the construction of main or essential parts of an optical transmission and reception module according to a third embodiment of the present invention.

The optical transmission and reception module of the third embodiment is similar to that of the second embodiment except that in the third embodiment, the LED 3' is not mounted on the sub-mount, but is mounted on the substrate 9 along with the receiving PD 5.

That is, in the third embodiment, the LED 3' and the receiving PD 5 are mounted on the substrate 9, and the mold resin 6 forming the lens portions 6a and 6b covers them.

According to the third embodiment, a printed wiring board or a lead frame is used as the substrate 9. Because the LED 3' and the receiving PD 5 are mounted on the same substrate 9, it is easy to perform mounting works such as a die-bonding work, a wire-bonding work, and the like in mass-production. Further, in the third embodiment, the number of component parts can be reduced. In addition, because it is unnecessary to mount the LED 3' and the receiving PD 5 on different members, it is expected that the LED 3' and the receiving PD 5 can be positioned with high accuracy.

(Fourth Embodiment)

Figure 11:
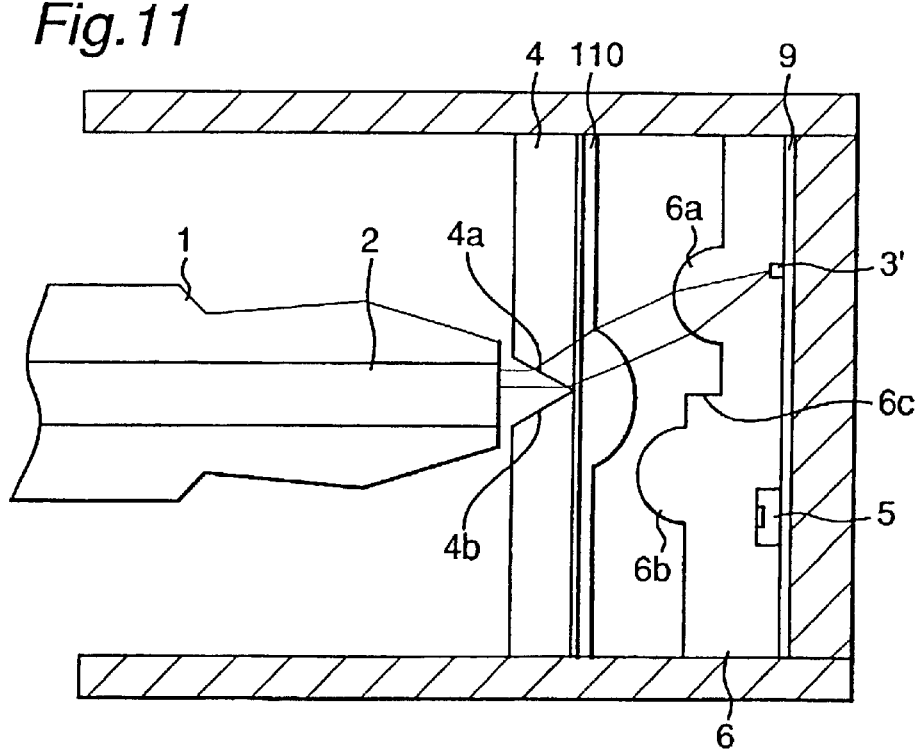
FIG. 11 is a schematic sectional view of main parts of an optical transmission and reception module according to a fourth embodiment.

FIG. 11 schematically shows the construction of main or essential parts of an optical transmission and reception module according to a fourth embodiment of the present invention.

The optical transmission and reception module of the fourth embodiment is similar to that of the third embodiment, except that in the fourth embodiment, a condenser lens 110 is placed alongside the Foucault prism 4 on the side of the LED 3' and the receiving PD 5 and that the mold resin 6 has a configuration different from that of the third embodiment.

That is, in the fourth embodiment, the optical transmission and reception module has the condenser lens 110, and a stepped portion 6c is formed on the mold resin 6 at a position substantially corresponding to the position of boundary between the first and second inclined surfaces 4a and 4b of the Foucault prism 4 to make the reception part of the mold resin 6 nearer to the condenser lens 110 than the transmission part thereof. The construction contributes to improvement of the efficiency in the optical transmission and reception.

The condenser lens 110 may be spherical or aspherical. The lens surface may face the LED 3' and the receiving PD 5 or the Foucault prism 4.

According to the fourth embodiment, in a light receiving time, the reception light discharged from the optical fiber 2 can be connected to the receiving PD 5, which is the light receiving element, without the reception light diffusing. In a light transmitting time, it is unnecessary to connect the transmission light to the optical fiber 2 with only the lens portion 6a of the mold resin 6. Therefore, light take-out efficiency can be improved by increasing the radius of curvature of the lens portion 6a.

(Fifth Embodiment)

Figure 12:
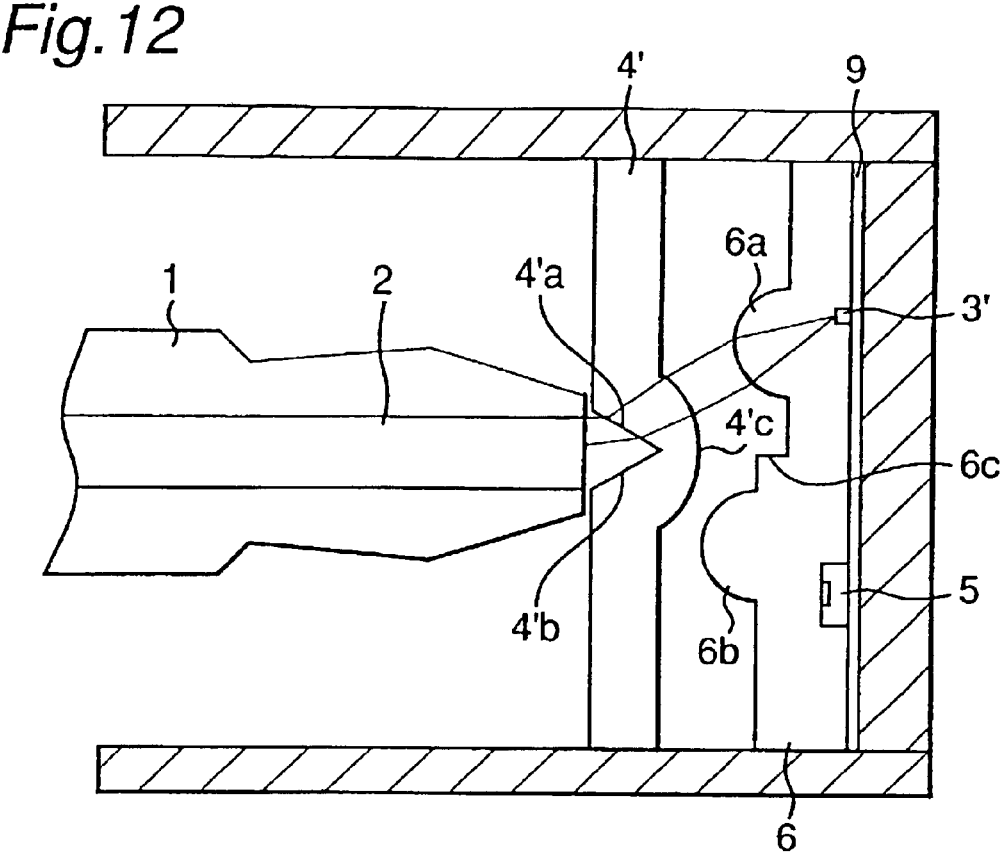
FIG. 12 is a schematic sectional view of main parts of an optical transmission and reception module according to a fifth embodiment.

FIG. 12 schematically shows the construction of main parts of an optical transmission and reception module according to a fifth embodiment of the present invention.

The optical transmission and reception module of the fifth embodiment is similar to that of the fourth embodiment, except that in the fifth embodiment, the Foucault prism and the condenser lens are integral with each other to form a lens-integrated Foucault prism 4'.

That is, in the fifth embodiment, the Foucault prism and the condenser lens are integrally molded out of a resinous material, such as the one mentioned in the first embodiment, by injection molding method or the like to form the lens-integrated Foucault prism 4'. The lens-integrated Foucault prism 4' has inclined surfaces 4'a and 4'b similar to the inclined surfaces 4a and 4b of the first through fourth embodiments, and a lens portion 4'c having a function similar to that of the condenser lens 110 of the fourth embodiment. Instead of the Foucault prism 4 and the condenser lens 110 of the fourth embodiment, the lens-integrated Foucault prism 4' is disposed in the optical transmission and reception module.

According to the fifth embodiment, because the number of component parts can be reduced, assembly of component parts can be simplified and facilitated. Further, it is possible to suppress Fresnel reflected light which would be generated in the interface between the condenser lens and the Foucault prism in the case where they are provided separately. Thus, it is possible to accomplish a highly efficient optical transmission and reception.

(Sixth Embodiment)

Figure 13A:
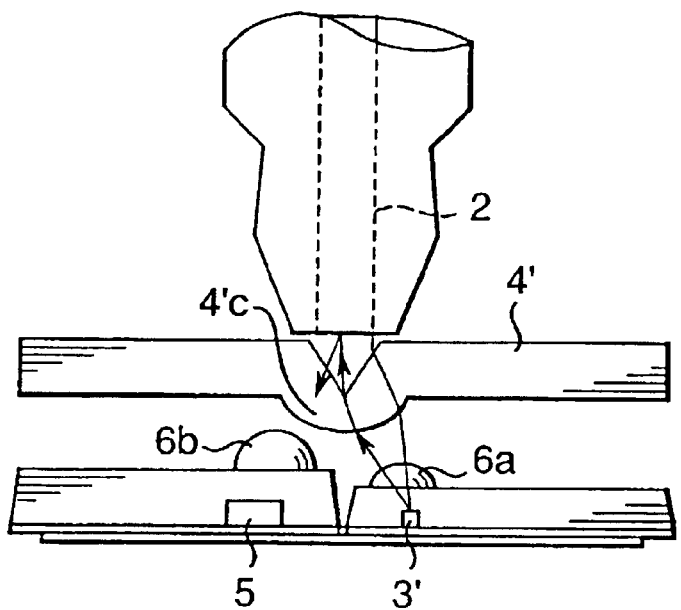
FIGS. 13A and 13B are explanatory views showing in what manner diverged light and converged light are incident on an end surface of an optical fiber, respectively, in an optical transmission and reception module according to a sixth embodiment.
Figure 13B:
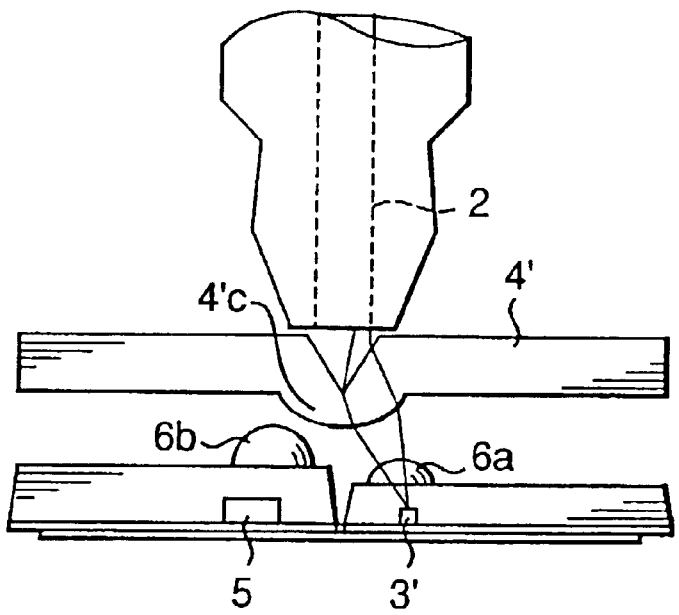
Figure 14:
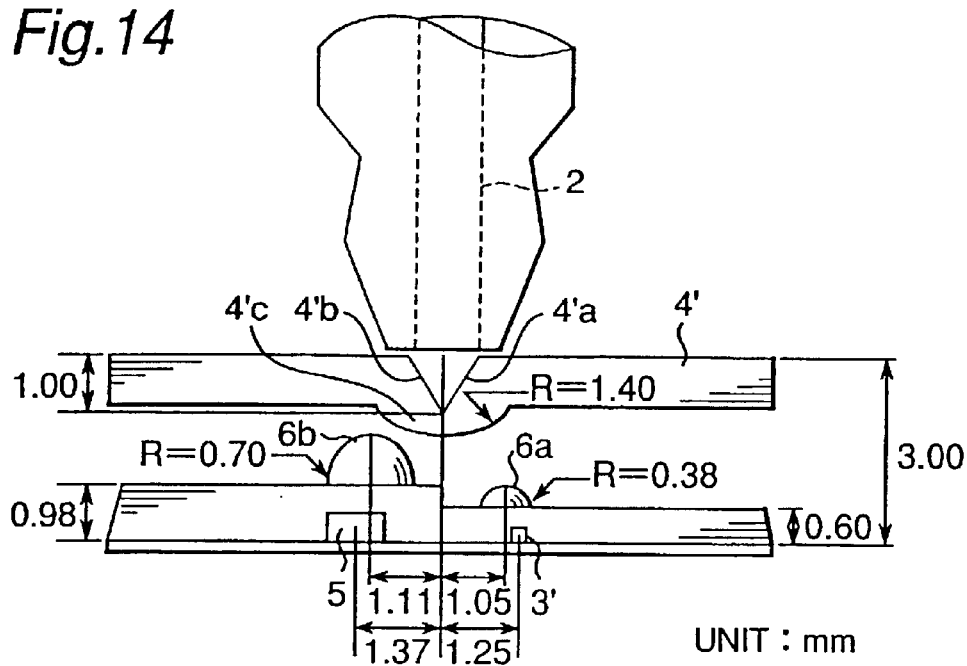
FIG. 14 shows an example of optical settings in the sixth embodiment.

FIGS. 13A, 13B, and 14 schematically show the construction of main or essential parts of an optical transmission and reception module according to a sixth embodiment of the present invention.

In the optical transmission and reception module of the sixth embodiment, the curvature of the lens portion 6a of the mold resin 6 and that of the lens portion 4'c of the lens-integrated Foucault prism 4' are so set that a convergent bundle of light rays falling within the numerical aperture (NA) value of the optical fiber 2 is incident on an end surface of the optical fiber 2.

As shown in FIG. 13A, if light incident on the end surface of the optical fiber 2 is diffused light, the Fresnel reflected light generated on the end surface of the optical fiber 2 will assume a diffused state, and a part of the Fresnel reflected light will be incident on the receiving PD 5, a light receiving element. Thus, it is difficult to carry out the full duplex communication method. On the other hand, if light incident on the end surface of the optical fiber 2 is convergent light, the Fresnel reflected light generated on the end surface of the optical fiber 2 returns to the LED 3' along the outgoing path.

FIG. 14 shows an example of various settings for the constituent parts including the radius of curvature of the lens portion 6a of the mold resin 6 and that of the lens portion 4'c of the lens-integrated Foucault prism 4' which have been determined in consideration of the above.

That is, the radius of curvature R of the lens portion 4'c of the lens-integrated Foucault prism 4' is set to 1.40 mm, the radius of curvature R of the lens portion 6a of the mold resin 6 is set to 0.83 mm, and the radius of curvature R of the lens portion 6b of the mold resin 6 is set to 0.70 mm, provided that the distance from a surface confronting the optical fiber 2 of the lens-integrated Foucault prism 4' to a mounting surface for the LED 3' and the receiving PD 5 is set to 3.00 mm, the depth of a groove defined by the inclined surfaces 4'a and 4'b of the lens-integrated Foucault prism 4' is set to 1.00 mm, the thickness of the mold resin 6 at the light receiving portion is set to 0.98 mm, the thickness of the mold resin 6 at the light transmitting portion is set to 0.60 mm, the distance from the position of boundary between the inclined surfaces 4'a and 4'b of the lens-integrated Foucault prism 4' and the center line of the LED 3' is set to 1.25 mm, the distance from the position of boundary between the inclined surfaces 4'a and 4'b of the lens-integrated Foucault prism 4' and the center line of the receiving PD 5 is set to 1.37 mm, the distance from the position of boundary between the inclined surfaces 4'a and 4'b of the lens-integrated Foucault prism 4' and the center of the lens portion 6a is set to 1.05 mm, and that the distance from the position of boundary between the inclined surfaces 4'a and 4'b of the lens-integrated Foucault prism 4' and the center of the lens portion 6b is set to 1.11 mm.

In the above example, the position of the boundary between the inclined surfaces 4'a and 4'b of the lens-integrated Foucault prism 4' is coincident with the center of the optical fiber 2.

According to the result of an optical simulation conducted on the optical transmission and reception module having the construction shown in FIG. 14, the optical transmission efficiency of the optical system was 14.5%, the light reception efficiency thereof was 34.5%, and the returned light was 0.365%. The percentage of the returned light of the optical transmission and reception module can be reduced to about ⅓ of that of the returned light of the prism array-adopted optical transmission and reception module proposed by Sharp Kabushiki Kaisha in the Japanese Patent Application No. 11-201047.

The radius of curvature of the lens-integrated Foucault prism 4' will be described below.

Whether the transmission light is successfully incident on the optical fiber 2 depends on the curvature of the lens portion 4'c of the lens-integrated Foucault prism 4'. Thus, the curvature of the lens portion 4'c of the lens-integrated Foucault prism 4' will be discussed, supposing that light rays collimated by the lens-integrated Foucault prism 4' are incident on the end surface of the optical fiber 2.

To make light incident on the optical fiber and propagate the light through the optical fiber, it is known that there is a relationship (1) between the numerical aperture NA of the optical fiber and the focal length F of a collimating lens:

$$NA = 0.5/F \quad (1)$$

The relationship between the focal length F of a plano-convex lens and the radius of curvature R of the spherical portion thereof is expressed as follows:

$$F = 2R \quad (2)$$

From the equations (1) and (2), an equation R=0.25/NA is obtained. Because the NA value of a normally used optical fiber (made of plastic) is 0.3 or less, a satisfactory characteristic can be obtained when the radius of curvature R is 0.84 mm or more.

Accordingly, the radius of curvature R of the lens portion 4'c of the lens-integrated Foucault prism 4' is preferably 0.84 mm or more.

A light ray tracking simulation was conducted on the case where diffused light rays were taken out from the lens portion 6a of the mold resin 6 and collimated by the lens-integrated Foucault prism 4'. As a result, it was found that converged light could be obtained when the radius of curvature R of the lens portion 4'c of the lens-integrated Foucault prism 4' was 1.45 mm or less.

From the above, it is preferable that the radius of curvature R of the lens portion 4'c of the lens-integrated Foucault prism 4' is 0.84 mm or more but 1.45 mm or less (0.84 mm≦R≦1.45 mm).

The radius of curvature R of the lens portion 4'c of the lens-integrated Foucault prism 4' is also applicable to the condenser lens 110 not integral with the Foucault prism 4 as in the fourth embodiment.

According to the sixth embodiment, it is possible to prevent the returned light from being connected to the light receiving element without deteriorating efficiency in the optical transmission and reception.

(Seventh Embodiment)

Figure 15:
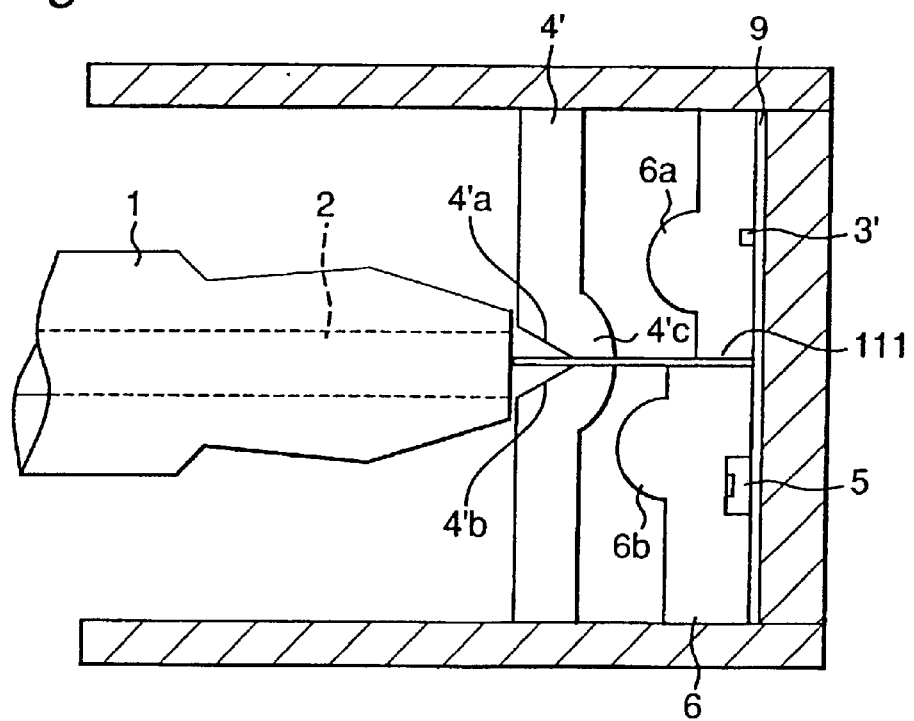
FIG. 15 is a schematic sectional view of main parts of an optical transmission and reception module according to a seventh embodiment.

FIG. 15 schematically shows the construction of main parts of an optical transmission and reception module according to a seventh embodiment of the present invention.

The optical transmission and reception module of the seventh embodiment is similar to that of the fifth embodiment, except that in the seventh embodiment, a partitioning plate 111 serving as a partitioning member is disposed between the transmission part and the reception part.

The partitioning plate 111 extends from the substrate 9 toward the end surface of the optical fiber 2 such that the partitioning plate 111 is very close to the end surface of the optical fiber 2. It is preferable that the partitioning plate 111 is made of a thin and strong material such as phosphorus-bronze of a thickness of 50 μm.

According to the seventh embodiment, the partitioning plate 111 prevents the transmission light from diffusing to the receiving PD 5 serving as the light receiving element and contributes to improvement of the S/N ratio of the reception light.

(Eighth Embodiment)

Figure 16:
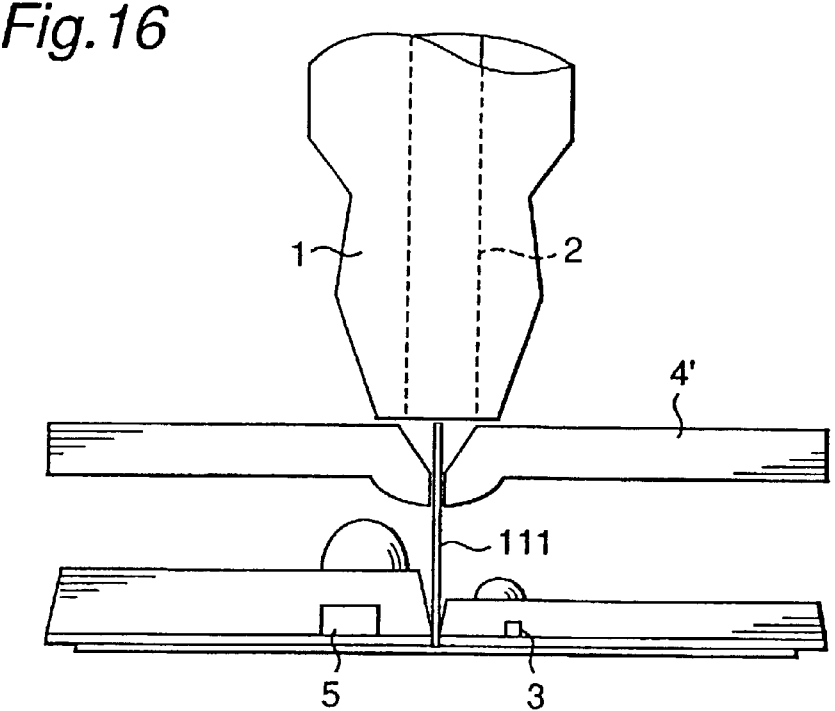
FIG. 16 shows an optical system inside an optical transmission and reception module according to an eighth embodiment.

FIG. 16 schematically shows the construction of essential parts of an optical transmission and reception module according to an eighth embodiment of the present invention.

The optical transmission and reception module of the eighth embodiment is similar to that of the seventh embodiment, except that in the eighth embodiment, the partitioning plate 111 is movable substantially in an axial direction of the optical fiber 2 when the partitioning plate 111 touches and presses the end surface of the optical fiber 2.

That is, when the end surface of the optical fiber 2 touches and presses the partitioning plate 111, the partitioning plate 111 moves toward the depth of the module (downward as viewed in FIG. 16).

Figure 17:
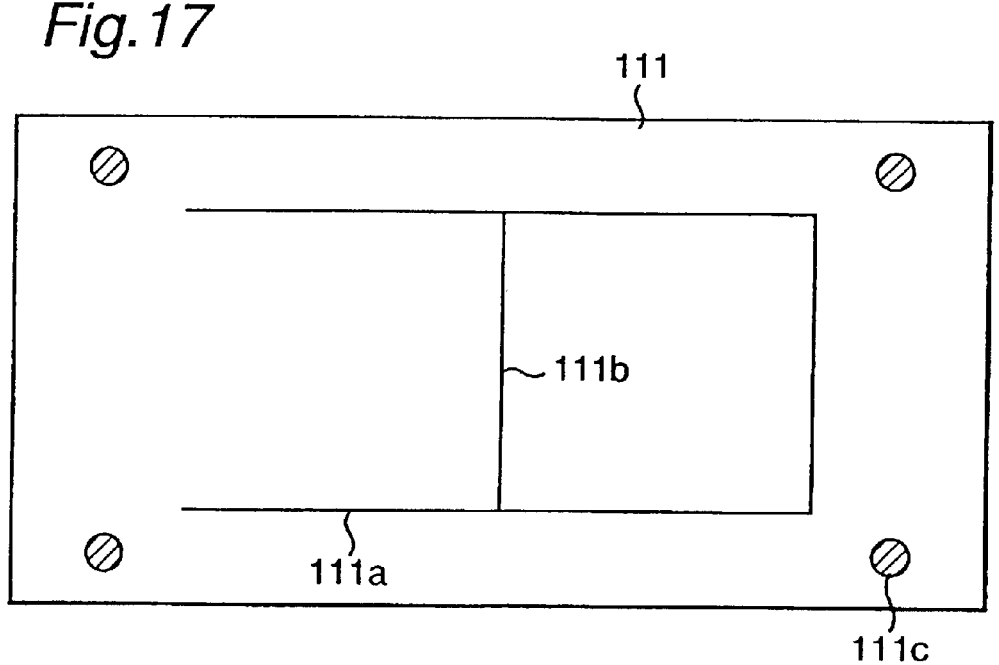
FIG. 17 is a plan view showing a method of forming a spring-like partitioning plate (elastic partitioning plate) in the eighth embodiment.

As shown in a plan view of FIG. 17, the spring-like partitioning plate (elastic partitioning plate) 111 can be formed by half-etching a phosphorus-bronze plate having a thickness of 50 μm, cutting it along a cutting line 111a, and bending the phosphorus-bronze plate along a bending line 111b. The partitioning plate 111 (elastic partitioning plate) 111 is fixed to the substrate 9 into a state as shown in FIG. 16 by inserting screws from outside of the substrate 9 into screwing holes 111c, shown in FIG. 17, of the partitioning plate 111.

According to the eighth embodiment, even if the end surface of the optical fiber 2 touches the partitioning plate 111 due to insertion and removal of the optical plug, it is possible to prevent the optical fiber 2 from being subjected to damage which otherwise would cause the efficiency of the optical transmission and reception to be deteriorated.

(Ninth Embodiment)

Figure 18:
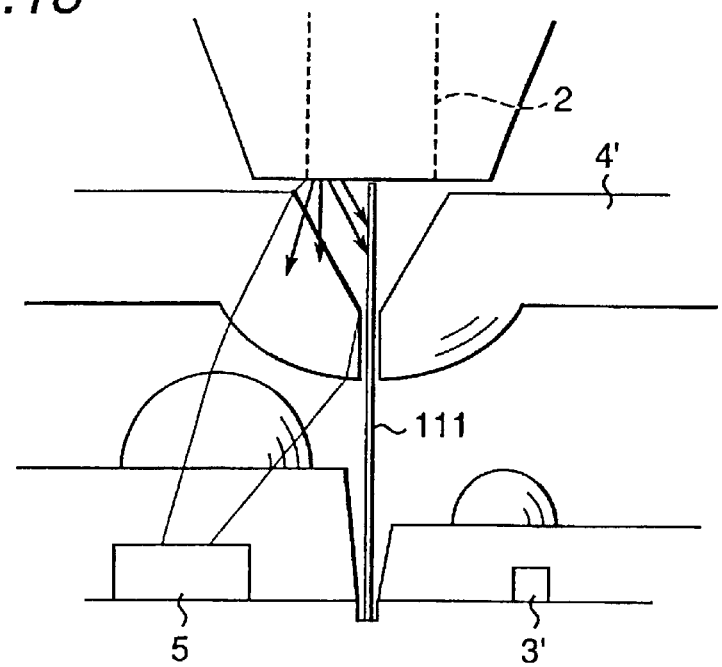
FIG. 18 shows an optical system inside an optical transmission and reception module according to a ninth embodiment.

FIG. 18 schematically shows the construction of main parts of an optical transmission and reception module according to a ninth embodiment of the present invention.

The optical transmission and reception module of the ninth embodiment is similar to the seventh embodiment, except that the partitioning plate 111 of the ninth embodiment has optical reflectiveness.

As described above, the partitioning plate 111 greatly reduces the amount of light rays (turbulent light) coupled to the receiving PD (light receiving element) 5 through the interior of the mold resin 6. The partitioning plate 111 prevents the transmission light from being radiated toward the receiving PD 5. Thereby, the S/N of the reception light can be improved.

Further, by making the reflectance of the surface of the partitioning plate 111 high, namely, by using a partitioning plate having a high reflectance as the partitioning plate 111, it is possible to effectively utilize, as the reception light, even light components which would be absorbed into the partitioning plate 111 at the time of reception if the surface of the partitioning plate 111 has a high absorptivity, as shown in FIG. 18.

The partitioning plate 111 is allowed to have the optical reflecting property by, for example, using a substance having a high reflectance, such as aluminum, as the material of the partitioning plate 111 itself, or coating the side surfaces of the partitioning plate 111 with a thin film of a material such as a metal having a high reflectance by a liquid phase method (e.g., gold plating) or a gaseous or vapor phase method (vacuum deposition, sputtering, or the like).

Figure 19:
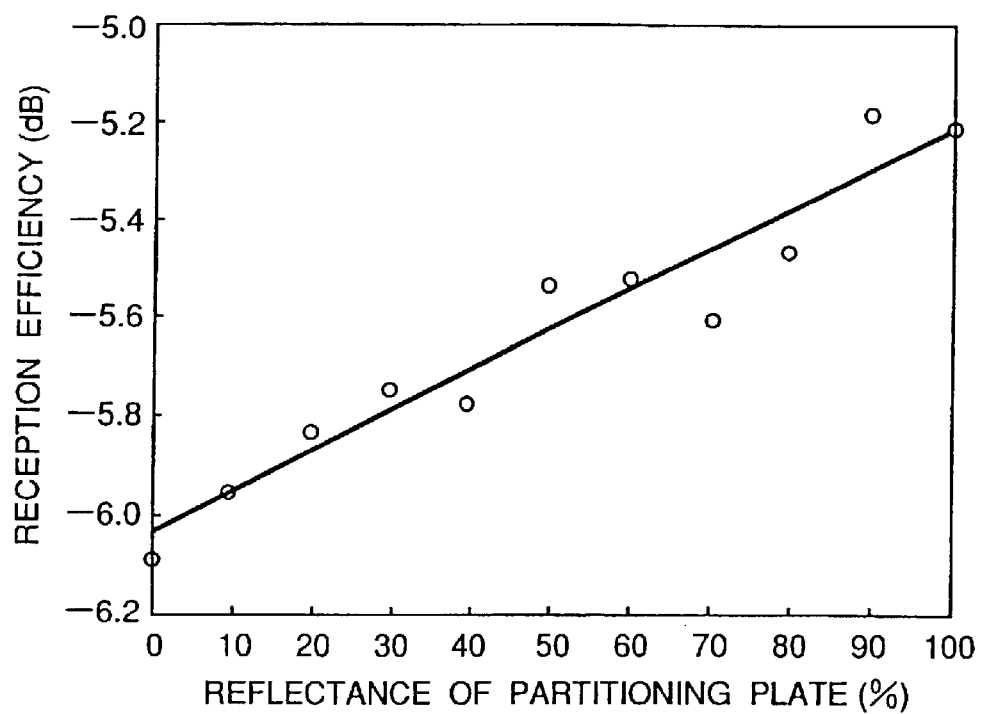
FIG. 19 is a graph showing the result of a simulation conducted to examine the relationship between the reflectance of a partitioning plate and receiving efficiency in the ninth embodiment.

FIG. 19 shows the result of a simulation about the change of light reception efficiency when the reflectance of the surface of the partitioning plate 111 is changed. As FIG. 19 indicates, as the reflectance of the surface of the partitioning plate 111 becomes higher, the light reception efficiency increases. For example, there is a difference of about 0.7 dB in the light reception efficiency between the partitioning plate 111 whose surface is entirely coated with black paint (reflectance is 0%) and the partitioning plate 111 whose surface is evaporated with aluminum.

As described above, according to the ninth embodiment, by using the partitioning plate 111 having a high reflectance, it is possible to effectively utilize, as the reception light, light components which would be absorbed by the partitioning plate 111 when the absorptivity of the surface thereof is high. The use of the partitioning plate 111 having a high reflectance is particularly effective when the transmission light and the reception light have the same wavelength band.

(Tenth Embodiment)

The optical transmission and reception module according to a tenth embodiment of the present invention will be described below with reference to FIGS. 20 and 21. FIG. 21 is an enlarged view of a region A surrounded with a broken line in FIG. 20.

The optical transmission and reception module of the tenth embodiment is similar to the seventh embodiment, except that the partitioning plate 111 of the tenth embodiment has light-absorbing property at an end surface thereof confronting the end surface of the optical fiber 2.

Figure 20:
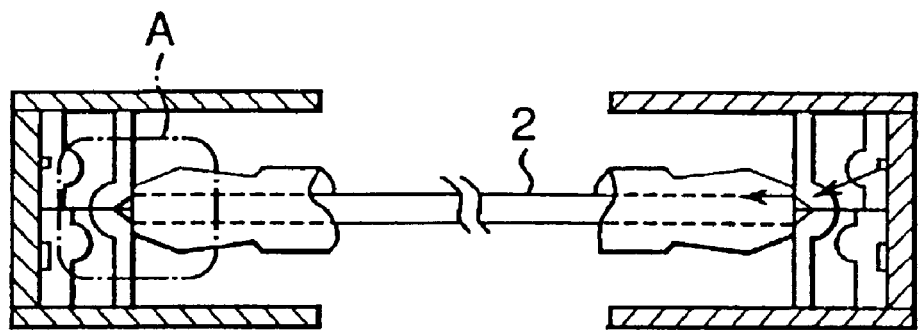
FIG. 20 is a schematic view showing the entire optical transmission and reception system, according to a 10th embodiment, including mutually associated optical transmission and reception modules.
Figure 21:
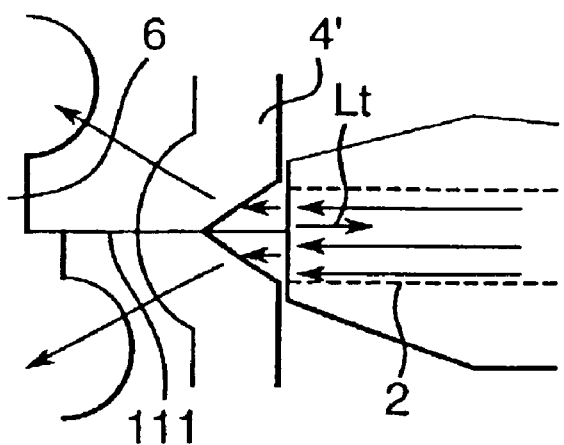
FIG. 21 is an enlarged view of a region A of FIG. 20.

If optical communication is made between the pertinent module and its counterpart, or associated module as shown in FIGS. 20 and 21, and if the end surface of the partitioning plate 111 in each module has a high reflectance and is flat, then a part Lt of transmission light from the pertinent module that has reached the counterpart will be reflected by the end surface of the partitioning plate 111 in the counterpart module and return to the pertinent module. Therefore, in the pertinent module, even though near-side reflection caused by turbulent light and Fresnel returned light within this module is removed, the amount of light returned from the associated module is large. Thus, it is impossible to improve S/N ratio at the light receiving element.

Thus, in the 10th embodiment, the absorptivity of the end surface of the partitioning plate 111 is increased by, for example, coating the end surface with black paint to suppress the far-side reflection occurring in the associated module.

(11th Embodiment)

In any of the first through 10th embodiments, the vertical angle of each of the Foucault prism 4 and the lens-integrated Foucault prism 4' are set to about 60 degrees, and the first inclined surface 4a of the Foucault prism 4 and the first inclined surface 4'a of the lens-integrated Foucault prism 4' are shown having an inclination almost equal to the inclination of each of the second inclined surface 4b of the Foucault prism 4 and the second inclined surface 4'b of the lens-integrated Foucault prism 4'.

The inclinations of the inclined surfaces 4a and 4b of the Foucault prism 4 and the inclined surfaces 4'a and 4'b of the lens-integrated Foucault prism 4', and the vertical angles of the Foucault prism 4 and the lens-integrated Foucault prism 4' will be described below.

The inclinations of the inclined surfaces 4a and 4b of the Foucault prism 4 and those of the inclined surfaces 4'a and 4'b of the lens-integrated Foucault prism 4' may be different such that the inclined surfaces are asymmetrical, as shown in FIGS. 22A and 22B, although these figures only show the case where the lens-integrated Foucault prism 4' is used.

That is, to allow the optical disposition to be more advantageous to the transmission part than to the reception part, namely, to improve the efficiency at the transmission part, the inclination of the inclined surface 4'a may be more gentle than that of the inclined surface 4'b as if the inclined surface 4'a became parallel to the end surface of the optical fiber 2, as shown in FIG. 22A. Alternatively, to allow the optical disposition to be more advantageous to the reception part than to the transmission part, namely, to improve the efficiency at the reception part, the inclination of the inclined surface 4'b may be more gentle than that of the inclined surface 4'a as if the inclined surface 4'b became parallel to the end surface of the optical fiber 2, as shown in FIG. 22B. Such setting of the inclination is optional.

In the preceding embodiments, the inclinations of the first inclined surfaces 4a, 4'a of the Foucault prism 4 and the lens-integrated Foucault prism 4' are almost equal to the inclinations of the second inclined surfaces 4b, 4'b of the Foucault prism 4 and the lens-integrated Foucault prism 4', respectively, because it is assumed that component parts such as a chip capacitor and the like are interposed between the LED 3' and the receiving PD 5.

Regarding the vertical angle of the Foucault prism 4 and that of the lens-integrated Foucault prism 4', for improvement of efficiency of both the optical transmission and reception, it may be advantageous to form the lens portions 6a and 6b of the mold resin 6 directly above the chips (LED 3' and receiving PD 5) and reduce the vertical angle of the Foucault prism 4 and that of the lens-integrated Foucault prism 4'. To realize the full duplex communication system, however, it is desirable to interpose the partitioning member (partitioning plate 111) between the transmission side and the reception side to intercept light. Thus, it is impossible to provide the LED chip in a position near the center of the substrate in view of the disposition of the lens portions 6a and 6b and the mounting of the chip. Taking the above into consideration, it is preferable to set the vertical angle of the Foucault prism 4 and the lens-integrated Foucault prism 4' to 15 degrees or more.

When the vertical angle of the Foucault prism 4 and the lens-integrated Foucault prism 4' is increased, a light amount that can be utilized as the transmission light is reduced because it is necessary to utilize oblique transmission light emitted from the lens portion 6a of the mold resin 6.

To examine this, a simulation was conducted in a predetermined condition. The vertical angle was set to 60 degrees as in the case of the first through tenth embodiments. As a result, the efficiency in the optical transmission and reception was lower by 0.8 dB than the efficiency in the optical transmission in the case where vertical light was utilized.

In the case where the vertical angle of the Foucault prism 4 and the lens-integrated Foucault prism 4' was further increased, the efficiency in the optical transmission was much lower. When the vertical angle was set to 75 degrees, the efficiency in the optical transmission was lower by 1.5 dB than the efficiency in the optical transmission in the case where the vertical light was utilized.

To obtain a satisfactory characteristic in a similar condition, the tolerable reduction of the efficiency in the optical transmission as compared when the vertical light is utilized is maximum about 1.8 dB. Thus, the vertical angle of the Foucault prism 4 and that of the lens-integrated Foucault prism 4' are preferably set to 75 degrees or less.

From the above, it is preferable to set the vertical angle θ of the Foucault prism 4 and that of the lens-integrated Foucault prism 4' to between 15 degrees and 75 degrees inclusive (15 degrees ≦ θ ≦ 75 degrees).

The first through 11th embodiments can be carried out in an appropriate combination thereof and applied to the half duplex communication system.

(12th Embodiment)

Figure 23:
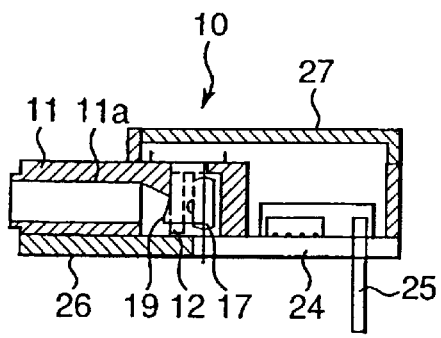
FIG. 23 is a sectional view showing the interior of an optical transmission and reception module according to a 12th embodiment when the interior is seen sideways.
Figure 24:
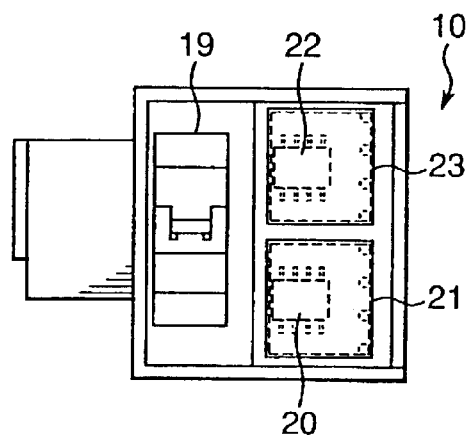
FIG. 24 is a plan view showing an optical transmission and reception module according to a 12th embodiment from which an upper lid has been removed.
Figure 25:
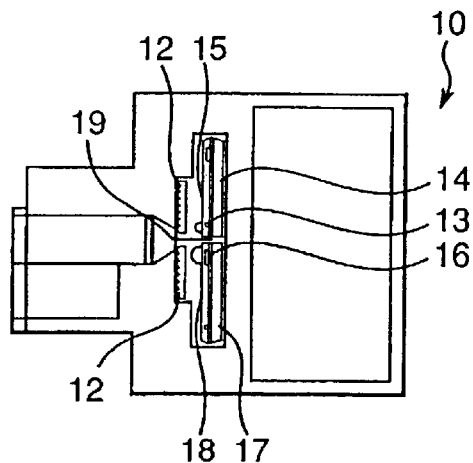
FIG. 25 is a rear view of the optical transmission and reception module, according to the 12th embodiment, from which a lower lid and a substrate have been removed.

FIG. 23 is a sectional view showing the optical transmission and reception module according to a 12th embodiment of the present invention. FIG. 24 is a plan view of the optical transmission and reception module from which an upper lid has been removed. FIG. 25 is a rear view of the optical transmission and reception module from which a lower lid and a substrate have been removed.

The outline of the optical transmission and reception module 10 of the 12th embodiment will be described below. The optical transmission and reception module 10 includes a receptacle 11 for holding a plug (described later) accommodating a one-core optical fiber when the plug is inserted into an insertion hole 11a, an optical branching element (optical element) 12, a light emitting device 14 having a sealed optical element 13, a first shield 15 made of an electrically conductive material and covering the light emitting device 14, a light receiving device 17 having a sealed light receiving element 16, a second shield 18 made of an electrically conductive material and covering the light receiving device 17, and a partitioning plate 19 which touches an end surface of the optical fiber at a center of the end surface such that the end surface of the optical plug is divided into two parts. The partitioning plate 19 also separates an optical path of transmission light and that of reception light from each other, and is movable in the longitudinal direction of the optical fiber. The optical transmission and reception module 10 also includes a driving IC 20 for the light emitting element 13, a third shield 21 covering the driving IC 20, an amplifying IC 22 for amplifying a signal of the light receiving element 16, a fourth shield 23 covering the amplifying IC 22; a substrate 24, such as a printed wiring board, for providing electrical wiring for the light emitting element 13, the light receiving element 16, the driving IC 20, and the amplifying IC 22, external input/output terminals 25; a lower lid 26, and an upper lid 27. An anti-reflection film is formed on surfaces of the optical branching element 12.

The light emitting device 14 is produced by soldering the light emitting element 13 to a lead frame consisting of a silver-plated copper plate, using silver paste or indium, to electrically connect the lead frame and the light emitting element 13 to each other by wire bonding, and then transfer-molding a semi-finished product composed of the lead frame and the light emitting element 13 in a die. A lens, namely, an optical element is integrally molded with a mold package at a top surface thereof at the time of the transfer-molding process. The light receiving device 17 is produced in a similar way but by replacing the light emitting element 13 with the light receiving element 16.

When a transmission signal (electrical signal) is inputted to the optical transmission and reception module through the external input/output terminal 25, the light emitting element 13 is driven by the driving IC 20, and transmission light rays (optical signal) are emitted by the light emitting element 13. The transmission light rays are substantially collimated by the lens formed on the surface of the light emitting device 14. The collimated light rays enter the optical branching element 12. As a result, with the optical path of the collimated light deflected, the collimated light gets incident on the optical fiber. In this case, if some of the transmission light rays deviate from the optical path because of dislocation of the optical branching element 12 and/or the light emitting element 13, those transmission light rays do not enter the light receiving device 17. This is because the partitioning plate 19 is extended to the position at which the partitioning plate 19 crosses a line connecting the light emitting element 13 with the light receiving element 16.

Also, transmission light rays reflected from an end surface, of the optical fiber, near to the optical transmission and reception module (hereinafter referred to as a "near-side end surface") will not enter the light receiving device 17 either because of the presence of the partitioning plate 19.

Further, the transmission light rays which have been transmitted through the optical fiber are partly reflected by an end surface, of the optical fiber, far from the optical transmission and reception module (hereinafter referred to as a "far-side end surface"). But such reflected light will disappear without being transmitted back through the optical fiber because the far-side end surface of the optical fiber inclines by 10 degrees, which will be described later.

The transmission light rays discharged from the far-side end surface of the optical fiber enter an associated optical transmission and reception module.

Supposing that the associated optical transmission and reception module has the same construction as that of the present pertinent optical transmission and reception module (In the figures, same reference numerals are used for both modules.), the transmission light rays reach an inclined contact surface, of the partitioning plate 19, which touches the end surface of the optical fiber. But the transmission light rays are not reflected by the inclined contact surface of the partitioning plate 19 because the inclined contact surface is coated with a light-absorbing material (e.g., black paint containing carbon).

Then, the transmission light rays reach the optical branching element 12, at which they are not reflected either because the surface of the optical branching element 12 is coated with an anti-reflection film. The transmission light rays incident on the optical branching element 12 are deflected in their optical paths, condensed by a lens formed on the surface of the light receiving device 18, and enter the light receiving element 16.

Light rays incident on the light receiving element 16 are partly reflected off. However, because the light rays are obliquely incident on the light receiving element 16, they are reflected obliquely in a direction opposite to the incident direction and thus do not return to the optical branching element 12. Thereafter, the light rays incident on the light receiving element 16 are photoelectrically converted into electrical signals. The electrical signals are amplified by the amplifying IC 22 and taken out as reception signals to the outside of the optical transmission and reception module through the external input/output terminal 25.

To realize the full duplex communication method, it is necessary to minimize the amount of a transmission signal that is mixed with a reception signal in the identical module. For example, to set a bit error rate (BER) to 1E-12 (i.e., 10 to the minus 12th power), 11.5 dB is required in S/N ratio. To this end, it is necessary to reduce both electrical crosstalk and optical crosstalk. A shield plate, which is per se known, is effective for reducing the electrical crosstalk, whereas a partitioning plate is effective for reducing the optical crosstalk.

According to this embodiment, by contacting the partitioning plate 19 with the end surface of the optical fiber and coating the end surface of the partitioning plate 19 with optical absorbing paint, in appropriate combination with the measures as described above, such as applying the anti-reflection film to the optical devices, inclining the light receiving element and/or the light emitting element, etc, the value 1E-12 as BER has been accomplished to thereby enable an optical transmission and reception by the full duplex communication method.

The optical transmission and reception module 10 of the 12th embodiment will be described in detail below.

Figure 26:
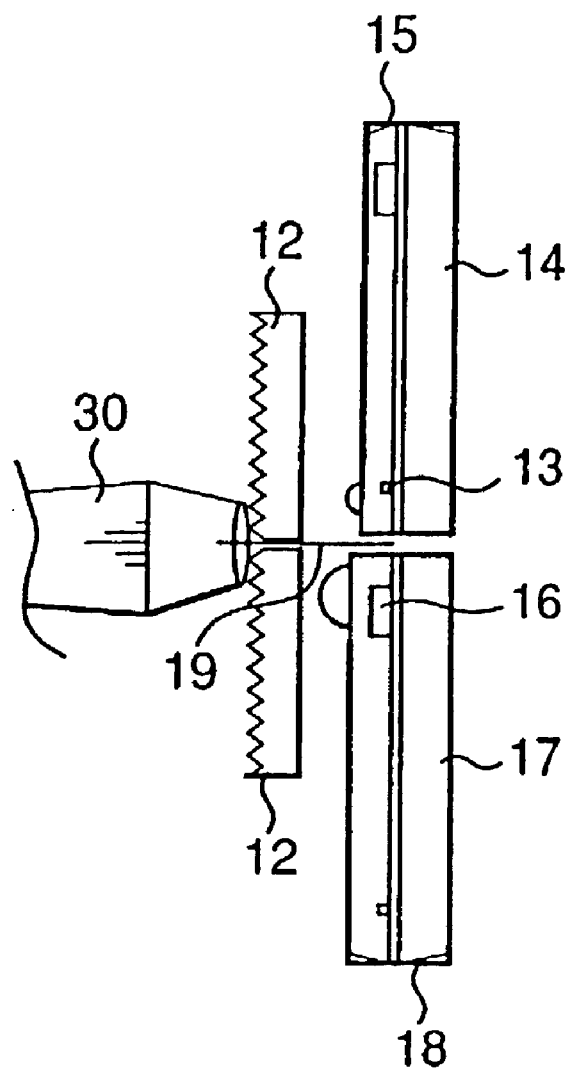
FIG. 26 shows an optical system in the optical transmission and reception module of FIGS. 23–25.

FIG. 26 is an enlarged cross-sectional view showing an optical system of the optical transmission and reception module 10.

As shown in FIG. 26, the partitioning plate 19 is in contact with the inclined end surface of the optical plug 30 accommodating the optical fiber. Thereby, the optical fiber disposed within the optical plug 30 and the partitioning plate 19 are in contact with each other.

The optical branching elements 12 and 12 are provided at the transmission side and the reception side respectively. The partitioning plate 19 is disposed at the boundary between the optical branching elements 12 and 12. Microprisms are formed on the surface of each of the optical branching elements 12 and 12 at regular intervals of 200 μm. The interval between the optical branching elements 12 and 12 through which the partitioning plate 19 is inserted is set to 100 μm.

The first shield 15 consisting of a copper plate covers the light emitting device 14 other than the lens portion thereof. The second shield 15 consisting of a copper plate covers the light receiving device 17 other than the lens portion thereof. The first and second shields 15 and 18 are electrically connected to the ground to reduce electrical crosstalk between the light emitting device 14 and the light receiving device 17 while preventing unnecessary incoming and outgoing light.

Inductive coupling is generated through holes or openings of the first and second shields 15 and 18 formed at the lens portion of each of the light emitting device 14 and the light receiving device 17. To prevent such inductive coupling from occurring, the partitioning plate 19 not only is extended to the boundary between the light emitting device 14 and the light receiving device 17, but also is formed of an electrically conductive material, with the electric potential thereof dropped to the ground potential.

The principle of the spring (elastic deformation) structure of the partitioning plate 19 will be described below.

Figure 27A:
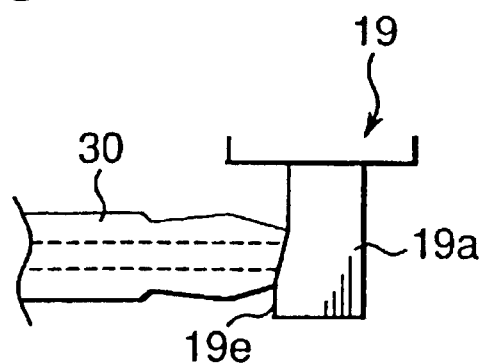
FIGS. 27A and 27B are a side view and a plan view, respectively, of a partitioning plate which is used in the optical transmission and reception module of the 12th embodiment, wherein an initial state of contact of an optical plug with the partitioning plate in shown.
Figure 27B:
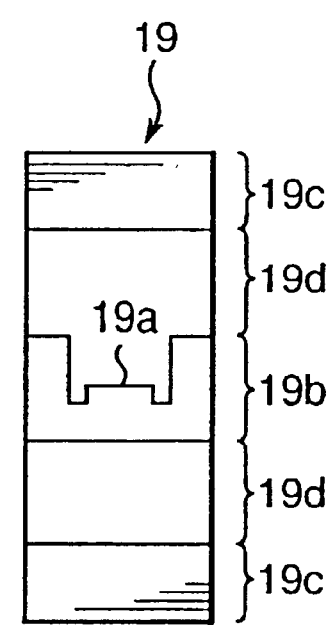
Figure 28A:
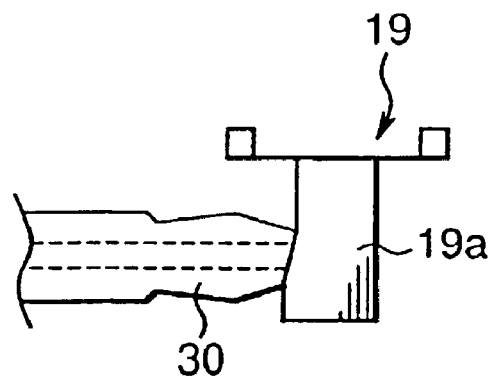
FIGS. 28A and 28B are a side view and a plan view, respectively, of the partitioning plate in the 12th embodiment at a terminal state of contact with the optical plug.
Figure 28B:
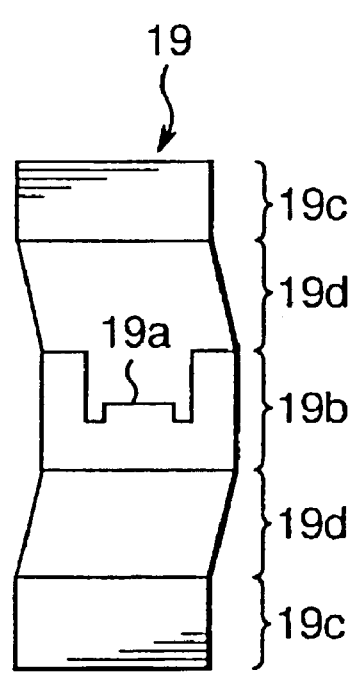

FIGS. 27A and 27B show an initial state of the contact of the optical plug 30 with the partitioning plate 19. FIGS. 28A and 28B show a terminal state of the contact of the optical plug 30 with the partitioning plate 19. FIGS. 27A and 28A are side views. FIGS. 27B and 28B are plan views.

There occur variations in the length of the optical plug 30 accommodating the optical fiber in a producing process. Thus, if the partitioning plate 19 is fixed to the receptacle 11, a gap will be generated between the near-side end surface of the optical fiber and the partitioning plate 19, depending on the length of the optical plug. If the gap is generated, the transmission light sent from the module is reflected by the near-side end surface of the optical fiber back to the module, and eventually enters the light receiving element 16 therein. Thus, the optical crosstalk increases. According to the embodiment, no gap is generated irrespective of the length of the optical plug 30 by allowing the partitioning plate 19 to be movable in the longitudinal direction of the optical fiber owing to the spring structure as shown in FIGS. 27 and 28 and pressing the partitioning plate 19 against the end surface of the optical fiber with a slight force. That is, generation of the gap can be prevented by disposing the partitioning plate 19 at a position where the partitioning plate 19 is pressed by the optical plug 30 (namely, the near-side end surface of the optical fiber) that has a minimum length. The partitioning plate 19 absorbs the variations in length of the optical plug 30 by its elastic deformation.

More specifically, as shown in FIGS. 27A–27B, and 28A–28B, the partitioning plate 19 includes a partitioning portion 19a for touching the end surface of the optical fiber, a base portion 19b from which the partitioning portion 19a extends vertically, fixing portions 19c for fixing the partitioning plate 19 to the receptacle 11, and elastically deformable portions 19d connecting the base portion 19b and the fixing portions 19c with each other at their opposite sides. The partitioning plate 19 is formed by cutting and bending a spring material such as a phosphorus-bronze plate or a stainless steel plate. For example, the partitioning plate 19 is formed by punching the flat spring material except portions that will serve as the partitioning portion 19a, the base portion 19b, the fixing portions 19c, and the elastically deformable portions 19d, then bending the portion serving as the partitioning portion 19a vertically upwardly, and then bending the portions serving as the elastically deformable portions 19d vertically downwardly, together with ends of the portions serving as the base portion 19b and the fixing portions 19c. The contact surface of the partitioning portion 19a for touching the optical fiber is formed as an inclined surface. A light-absorbing layer 19e is formed on the contact surface of the partitioning portion 19a.

The partitioning plate 19 can be fixed to the receptacle 11 by, for example, screwing the fixing portions 19c on the receptacle portion 11.

Thus, when the partitioning plate 19 is pressed by the optical plug 30, the elastically deformable portions 19d are elastically deformed to be displaced from a horizontal state shown in FIG. 27B to an inclined state shown in FIG. 28B.

Figure 29A:
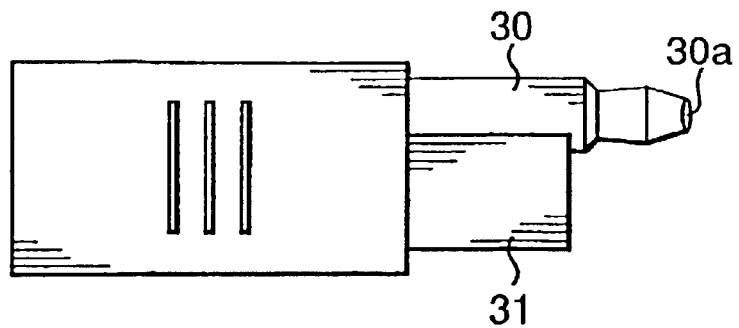
FIGS. 29A and 29B are a rear view and a side view, respectively, of an optical cable for use in the optical transmission and reception module of the 12th embodiment.
Figure 29B:
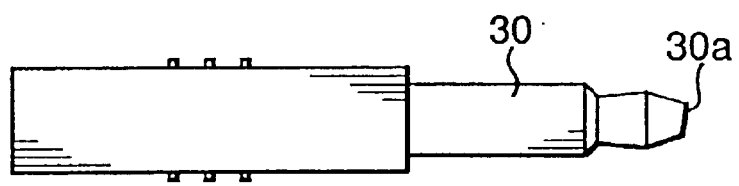
Figure 30:
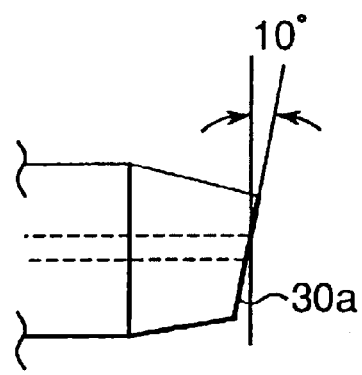
FIG. 30 is an enlarged view of a front end of the optical cable in the 12th embodiment.
Figure 31A:
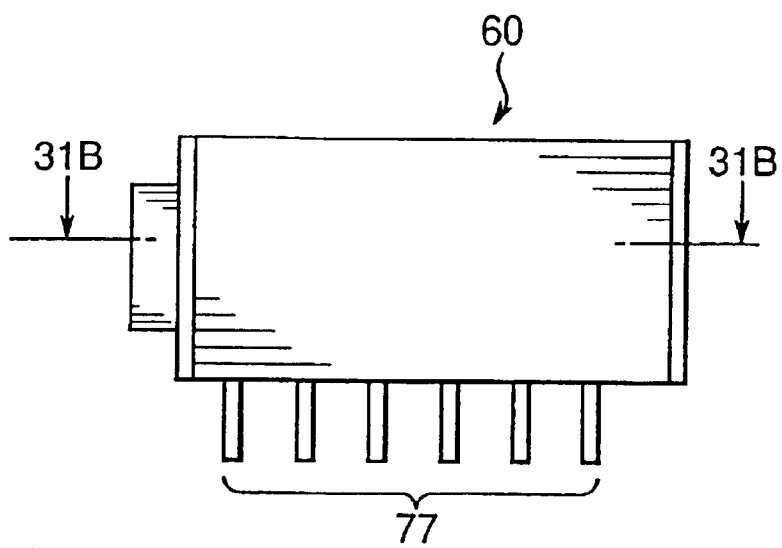
FIG. 31A is a side view showing an optical transmission and reception module in an optical transmission and reception system according to a 13th embodiment of the present invention.
Figure 31B:
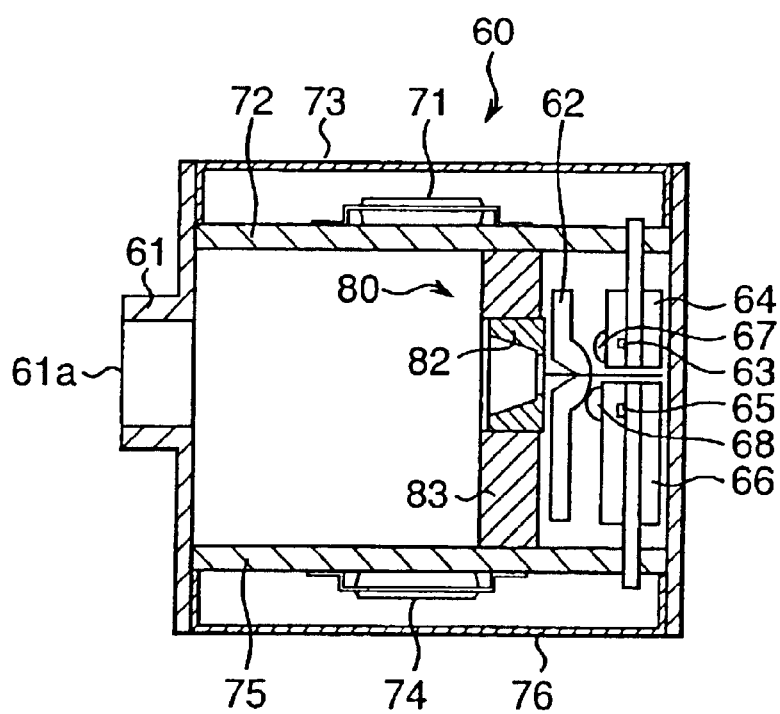
FIG. 31B is a sectional view taken along a line 31B—31B of FIG. 31A.
Figure 32:
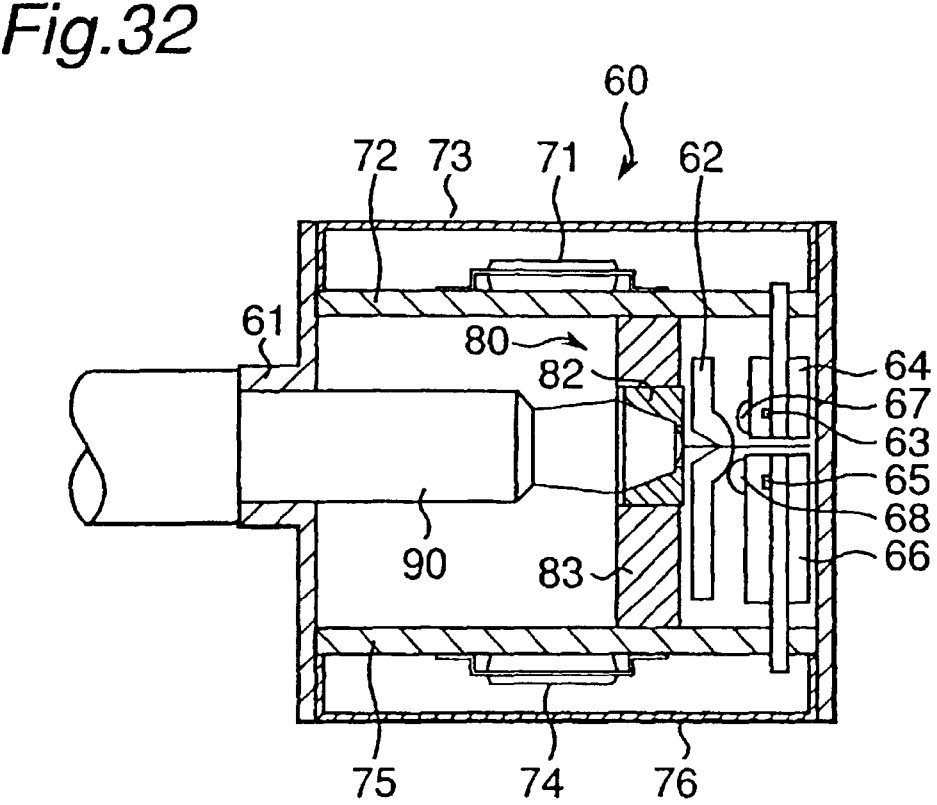
FIG. 32 is a sectional view similar to FIG. 31, showing the optical transmission and reception module into which the optical plug is inserted.

FIGS. 29A and 29B are a rear view and a side view showing main portions of an optical cable to be fit to the optical transmission and reception module to constitute an optical transmission and reception system together with this module. FIG. 30 is an enlarged view of a front end portion of the optical plug.

The end of the optical plug 30 (containing optical fiber) is cut obliquely to form an inclined surface 30a at 10 degrees relative to a direction orthogonal to the longitudinal direction of the optical fiber. That is, the end of the optical plug 30 inclines forward in the longitudinal direction of the optical fiber. Also, the optical plug is provided with an anti-rotation key 31 to prevent input and output characteristics of light from being varied with the rotation of the optical plug 30. In this case, the optical transmission and reception module is provided with an engaging means (not shown) such as a keyway in which the key 31 fits. The inclined surface 30a may have a desired rotation angle relative to the longitudinal axis of the optical fiber.

(13th Embodiment)

In the optical transmission and reception system described immediately before, the anti-rotation key 31 is formed on the optical plug 30. Thus, unless the anti-rotation key 31 is fitted in the keyway of the optical transmission and reception module, the optical plug cannot be inserted into the optical transmission and reception module. Therefore, it is an inconvenience to a user.

However, if the anti-rotation key 31 is removed from the optical plug 30 to provide a convenience to the user, the optical plug 30 becomes rotatable. Thus, the optical plug 30 may rotate, with the end surface 30a of the optical fiber in contact with the partitioning plate 19. As a result, the end surface 30a of the optical fiber and the partitioning plate 19 may be broken or damaged.

The 13th embodiment has been devised to solve the problems. The optical transmission and reception system of the 13th embodiment will be described below with reference to FIGS. 31 through 38.

As shown in FIGS. 31A, 31B, 32, and 33A through 33D, the optical transmission and reception module 60 for the system includes a receptacle 61 holding an optical plug 90 accommodating a one-core optical fiber 91 when the optical plug 90 is inserted through an insertion hole 61a; a pair of optical branching elements (optical elements) 62 coated with an anti-reflection film, a light emitting device 64 having a sealed optical element 63, a shield (not shown) made of an electrically conductive material and covering the light emitting device 64, a light receiving device 66 having a sealed light receiving element 65, a shield (not shown) made of an electrically conductive material and covering the light receiving device 66, and a partitioning member 80 separating an optical path of transmission light and that of reception light from each other and movable in the longitudinal direction of the optical fiber. The optical transmission and reception module also includes a driving IC 71 for the light emitting element 63, a substrate 72, such as a printed wiring board (PWB), for providing electrical wiring for the driving IC 71, a shield 73 covering the driving IC 71 and the substrate 72, an amplifying IC 74 for amplifying a signal of the light receiving element 65, a substrate 75 consisting of, for example, a PWB for providing electrical wiring for the amplifying IC 74, a shield 76 covering the amplifying IC 74 and the substrate 75, and external input/output terminals 77. In the shown example, the Foucault prism is used as the optical branching element 62. Alternatively, a microprism array may be used as the optical branching element 62.

Figure 33D:
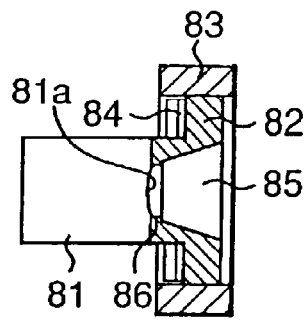
FIGS. 33B, 33C, and 33D are sectional views respectively taken along a line 33B—33B, a line 33C—33C, and a line 33D—33D of FIG. 33A, respectively.
Figure 33A:
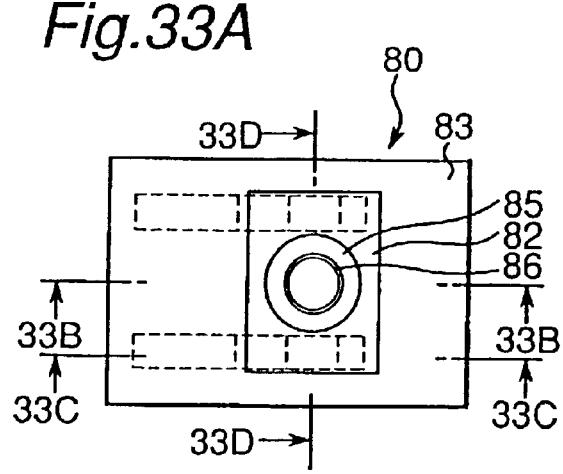
FIG. 33A is a front view showing a partitioning member for use in the optical transmission and reception module of FIGS. 31A and 31B.
Figure 33B:
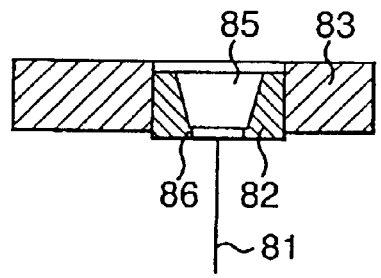
Figure 33C:
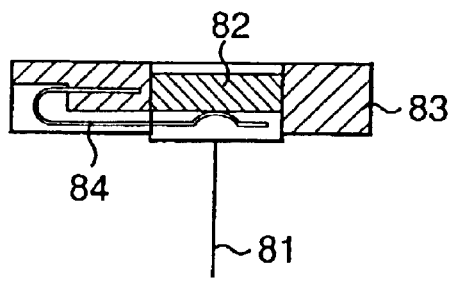

The partitioning member 80 has a partitioning plate 81 disposed between the light emitting device 64 and the light receiving device 66 and between a pair of the optical branching elements 62, an engaging portion 82 to which one end of the partitioning plate 81 is fixed, and a holding portion 83 holding the engaging portion 82, and hence, the partitioning plate 81 movably in the optical axis direction of the optical fiber 91. As is clearly shown in FIGS. 33B and 33D, the engaging portion 82 has, at its center, an approximately truncated cone-shaped hole 85 for receiving the front end of the optical plug 90 smoothly, and an annular projection 86 formed at the bottom of the hole 85 and projecting radially inwardly. The partitioning plate 81 consists of a phosphorus-bronze plate or a stainless steel plate about 50 μm thick and fixed to the bottom of the engaging portion 82 by insert molding. The partitioning plate 81 has a concave surface 81a formed at a side thereof confronting the hole 85. The concave surface 81a is coated with a light-absorbing material (e.g., black paint containing carbon). As indicated in FIG. 33C, a leaf spring 84 consisting of a phosphorus-bronze plate or a stainless steel plate is fitted to the holding portion 83 by insert molding or press fit. The leaf spring 84 always urges the engaging portion 82 toward the plug insertion hole 61a, namely, toward the optical fiber 91. The engaging portion 82 is slidably fit in a rectangular hole penetrating the holding portion 83. Thus, if a force greater than the spring force of the leaf spring 84 acts on the engaging portion 82, the engaging portion 82 and the partitioning plate 81 fixed thereto move to the side opposite to the location of the plug insertion hole 61a.

Figure 34:
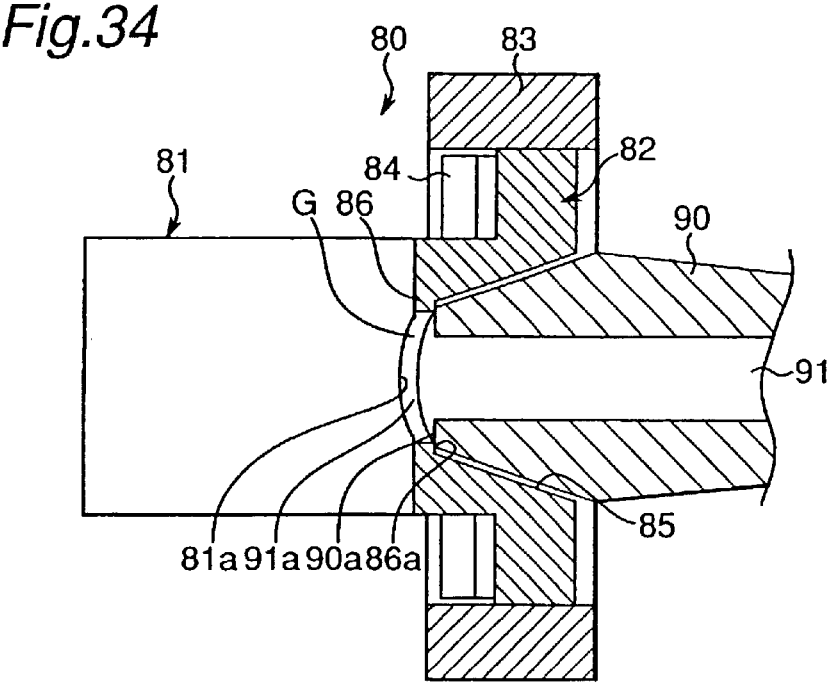
FIG. 34 is a sectional view showing a state of contact between an engagement portion of the partitioning member and the optical plug in the optical transmission and reception module of FIGS. 31A and 31B.
Figure 38:
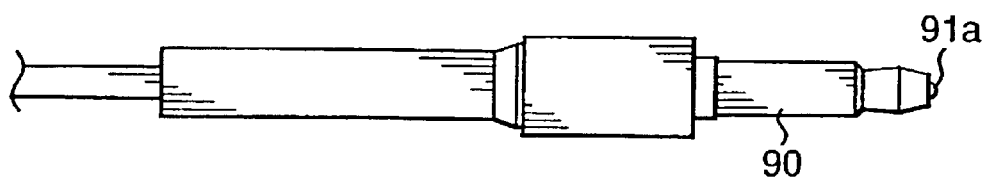
FIG. 38 is a perspective view showing one end of an optical cable in an optical transmission and reception system of the present invention.

The optical transmission and reception module 60 and an optical cable shown in FIG. 38 constitute an optical transmission and reception system. The optical cable has an optical plug 90 at both ends thereof (only one end is shown in FIG. 38) and an optical fiber 91 passes through the plugs. As indicated in FIG. 38, the optical plug 90 does not have an anti-rotation mechanism and is thus rotatable. An end surface 91a of the optical fiber 91 projects from an end of the optical plug (ferrule). As shown in FIG. 34, a radially outward portion of the end surface 91a covers a part of an end surface 90a of the optical plug 90. The optical fiber end surface 91a is a curved surface which is rotationally symmetrical about the optical axis of the optical fiber. In the example shown in FIG. 34, the end surface 91a of the optical fiber 91 is a convex. Because a light flux reflected from the curved surface spreads, the reflected light flux is absorbed into a cladding of the optical fiber while the light flux is propagating through the optical fiber. Consequently, the amount of reflected light discharged from the optical fiber is smaller than when the optical fiber has a flat end surface. The concave surface 81a of the partitioning plate 81 is complementary to the convex surface of the end surface 91a of the optical fiber 91 in the configurations thereof.

As clearly shown in FIG. 34, when the optical plug 90 is inserted into the module 60 through the plug insertion hole 61a, the front end of the optical plug 90 fits in the hole 85 of the engaging portion 82 of the partitioning member 80, and a portion of the plug end surface 90a not covered with the fiber end surface 91a comes into contact with a surface (engaging surface) 86a of the projection 86 of the engaging portion 82. In this manner, the relative positions of the front end of the optical fiber 91 and the partitioning plate are determined. At this time, a gap G having a dimension equivalent to the thickness of the projection 86 is generated between the optical fiber end surface 91a and the opposed surface 81a of the partitioning plate 81. The optical fiber end surface 91a is convex and the opposed surface 81a of the partitioning plate 81 is concave to make the end surface 91a and the opposed surface 81a complementary to each other. Therefore, the dimension of the gap G is constant even in positions off the center of the optical fiber. Although the dimension of the gap G depends on the construction of an optical system, it is favorable to set the dimension of the gap G to less than 0.3 mm (0 mm<G<3 mm). It is favorable to set the dimension of the gap G as small as possible. In the 13th embodiment, the gap G is set to about 0.2 mm. It has been experimentally confirmed that when the gap G is about 0.2 mm, the optical transmission and reception module 60 can reduce the bit error rate (BER) to $10^{-12}$ and implement the full duplex communication method sufficiently.

Because the leaf spring 84 urges the engaging portion 82 of the partitioning member 80 toward the plug insertion hole 61a, namely, toward the optical plug 90, the engaging surface 86a is always pressed against the plug end surface 90a at a slight force. Furthermore, the optical fiber end surface 91a is curved and rotationally symmetrical about the axis of the optical fiber 91. Therefore, even if the optical plug 90 rotates, the configuration of the optical fiber end surface 91a does not change relative to the opposed concave surface 81a. From these features, the dimension of the gap G is kept constant.

The optical plug 90 containing the optical fiber 91 has variations in its length due to the manufacturing process. Thus, if the position of the partitioning plate 81 is fixed by, for example, fixing the partitioning member 80 to the receptacle 11, the dimension of the gap G between the optical fiber end surface 91a and the opposed concave surface 81a of the partitioning plate 81 may be larger than a preset dimension, depending on the length of the optical plug. For example, supposing that the optical plug is formed as a circular type in conformity to the standard EIAJ-RC5720B, the length of the optical plug is in the range of 14.7–15 mm due to variations caused by the manufacturing process. Supposing that the gap G is set to 0.2 mm, and that the position of the partitioning plate 81 is fixed in conformity to a longest optical plug, the gap may assume a value of 0.5 mm for some optical plugs. However, in the 13th embodiment, a position corresponding to a conceivable shortest length of the optical plug is set as an initial position of the partitioning member 80 (more specifically, the engaging portion 82), the partitioning member 80 is movable in the longitudinal direction of the optical fiber 91, and the leaf spring 84 always presses the engaging portion 82 against the end surface 90a of the optical plug 90 with a slight force. Therefore, irrespective of the length of the optical plug 90, the dimension of the gap G is kept constant.

Owing to the rotation of the optical plug 90, the end surface 90a of the optical plug 90 slides on the engaging surface 86a. Thus, it is preferable to compose the engaging surface 86a of a material having a low coefficient of sliding friction and a high resistance to abrasion, such as fluoroplastic or ultra high molecular weight polyethylene.

The operation of the optical transmission and reception system having the above construction will be described below. When a transmission signal (an electrical signal) is supplied from outside to the optical transmission and reception module 60 through the input/output terminals 77, the light emitting element 63 is driven by the driving IC 71, and transmission light (an optical signal) is emitted by the light emitting element 63. The transmission light rays are substantially collimated by a lens 67 formed at a top surface of the light emitting device 64. The collimated light enters the optical branching element 62. As a result, with the path of the collimated light deflected, the collimated light enters the optical fiber 91. Transmission light rays reflected by the end surface 91a, of the optical fiber 91, near the optical transmission and reception module (hereinafter referred to as a "near-side end surface") pass through the gap G between the partitioning plate 81 and the optical fiber end surface 91a and enter the light receiving device 66. At this time, because the gap G is as small as 0.2 mm, the amount of the incident light rays is small.

The transmission light rays which have been transmitted through the optical fiber 91 are partly reflected from the other end surface 91a, of the optical fiber 91, far from the optical transmission and reception module (hereinafter referred to as a "far-side end surface"). But, because the optical fiber end surface 91a is convex, the light flux reflected therefrom tends to spread, so that the reflected light flux is absorbed into the cladding of the optical fiber while the light flux is propagating through the fiber. Consequently, the amount of reflected light discharged from the near-side end surface 91a of the optical fiber 91 is small.

On the other hand, the transmission light rays discharged from the optical fiber far-side end surface 91a enter an associated optical transmission and reception module which is currently a receiving end.

Supposing that the associated optical transmission and reception module of the currently receiving side has the same construction as that of the pertinent optical transmission and reception module (In the figures, same reference numerals are used for both modules.), the transmission light rays first reach the opposed surface 81a of the partitioning plate 81 of the associated module. But the transmission light rays are not reflected by the opposed surface 81a because it is coated with a light-absorbing material (e.g., black paint containing carbon).

Then, the transmission light rays reach the optical branching element 62 at which there occurs no reflection because the surface of the optical branching element 62 is coated with an anti-reflection film. The transmission light incident on the optical branching element 62 is deflected, and then condensed by a lens 68 formed at the surface of the light receiving device 66, and finally enters the light receiving element 65.

Light rays incident on the light receiving element 65 are partly reflected off. However, because the light rays are obliquely incident on the light receiving element 65, they are reflected obliquely in a direction opposite to the incident direction and thus do not return to the optical branching element 62. Thereafter, the light rays incident on the light receiving element 65 are photoelectrically converted into electrical signals. The electrical signals are amplified by the amplifying IC 74 and taken out as reception signals to the outside of the optical transmission and reception module through the external input/output terminals 77.

In the optical transmission and reception system, generation of the electrical crosstalk is suppressed by using the shielding plate. In addition, the optical crosstalk is suppressed by using the partitioning member 80 having the partitioning plate that confronts the end surface of the optical fiber with a very slight gap therebetween. Therefore, it is possible to achieve the optical transmission and reception by the full duplex communication method. Further, because the gap is provided between the partitioning plate and the end surface of the optical fiber, the optical fiber end surface and the partitioning plate are not damaged by the rotation of the optical plug.

Figure 35:
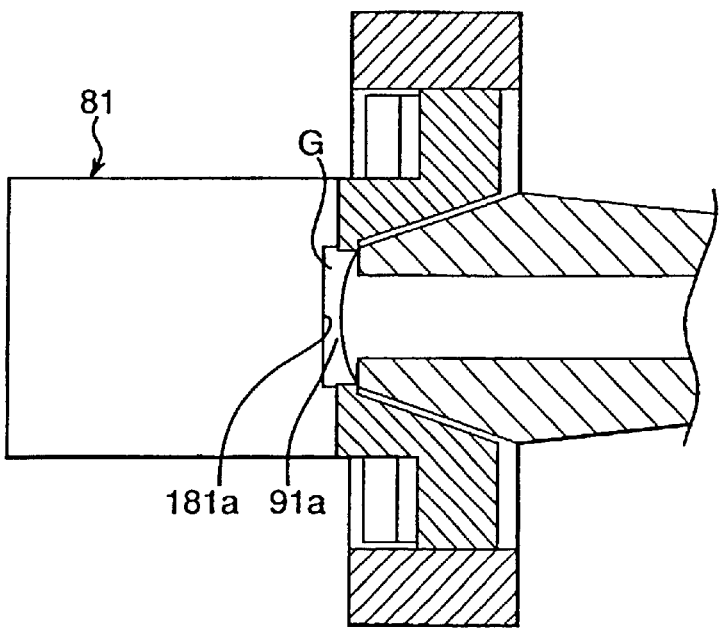
FIG. 35 is a sectional view similar to FIG. 34, showing a variant of the partitioning member.

In the optical transmission and reception system, the optical fiber end surface 91a is convex and the opposed surface 86a of the partitioning member 80 is concave to allow the dimension of the gap G to be constant even in positions off the center of the optical fiber. However, a large gap is allowed, depending on the construction of an optical system. In such a case, as shown in FIG. 35, the opposed surface of the partitioning plate 81 may be a non-curved surface 181a.

Figure 36:
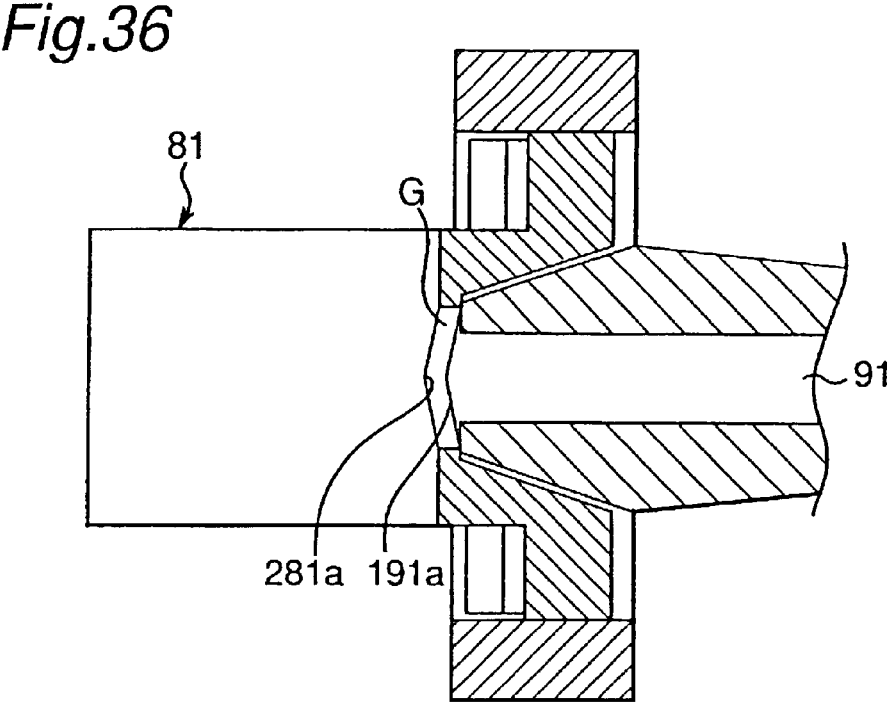
FIG. 36 is a sectional view similar to FIG. 34, showing a variant of the partitioning member and an end surface of the optical fiber.
Figure 37:
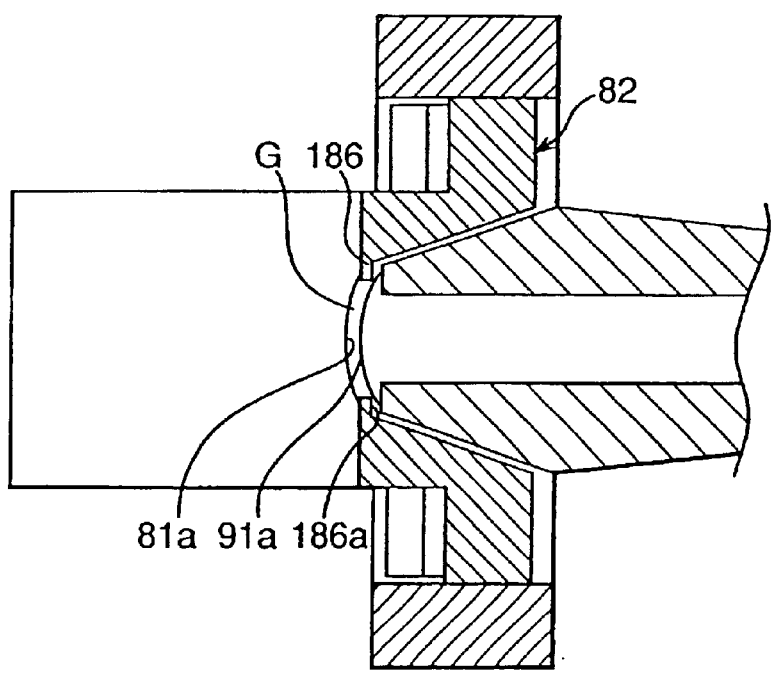
FIG. 37 is a sectional view similar to FIG. 34, showing another variant of the partitioning member.

The front end of the optical fiber may have a surface 191a of a conic shape, instead of the convex shape, as shown in FIG. 36. In the example shown in FIG. 36, to keep the dimension of the gap G constant even in the positions off the center of the optical fiber, an opposed surface 281a of the partitioning plate 81 has a shape complementary to the conic surface 191a. As far as the end surface of the optical fiber is rotationally symmetrical about the axis of rotation of the plug, the amount of light reflected by this end surface is smaller than that of light reflected by a flat surface. Thus, the dimensions of the gap may be set according to the shape of the end of the optical fiber.

Furthermore, in the optical transmission and reception system described above, the engaging portion 82 of the partitioning member 80 touches the end surface of the plug. Alternatively, the projection 186 of the engaging portion 82 may be made longer than the projection 86 shown in FIG. 34 so that the projection 186 touches the end surface 91a of the optical fiber. In this case, the contact position of the optical fiber is limited to a region through which light does not pass. More specifically, in the case of an optical fiber whose cladding is 1 mm in diameter, the contact position on the optical fiber should be radially outward from the center of the optical fiber by more than 0.5 mm. In the example shown in FIG. 37, the gap G is adjusted to the same dimension as that shown in FIG. 34 by making the thickness of the projection 186 of the engaging portion 82 smaller than that of the projection 86 shown in FIG. 34.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical cable having a one-core optical fiber passed therethrough, wherein each of end surfaces of the optical fiber is a curved surface rotationally symmetrical about an optical axis of the optical fiber.

2. An optical cable according to claim 1, wherein each end surface of the optical fiber projects from a plug provided at opposite ends of the optical fiber, and a radially outward portion of the end surface of the optical fiber covers a part of an end surface of the plug.

3. An optical cable according to claim 1, wherein the rotationally symmetrical curved surface consists of a convex surface or a cone-shaped surface.

* * * * *

UNITED STATES PATENT AND TRADEMARK OFFICE
CERTIFICATE OF CORRECTION

PATENT NO.    : 6,718,091 B2
DATED         : April 6, 2004
INVENTOR(S)   : Takehisa Ishihara and Hajime Kashida It is certified that error appears in the above-identified patent and that said Letters Patent is hereby corrected as shown below:

<u>Title page,</u>
Item [75], Inventors, please delete "Kentaro Terashima".
Item [56], References Cited, FOREIGN PATENT DOCUMENTS, insert
-- JP    7-248429        9/1995 --.

Signed and Sealed this

Twenty-ninth Day of November, 2005

JON W. DUDAS
*Director of the United States Patent and Trademark Office*